United States Patent [19]

Cohen

[11] Patent Number: 5,321,541
[45] Date of Patent: Jun. 14, 1994

[54] PASSIVE OPTICAL COMMUNICATION NETWORK WITH BROADBAND UPGRADE

[75] Inventor: Leonard G. Cohen, Berkeley Heights, N.J.

[73] Assignee: AT&T Bell Laboratories, Murray Hill, N.J.

[21] Appl. No.: 857,365

[22] Filed: Mar. 25, 1992

Related U.S. Application Data

[63] Continuation-in-part of Ser. No. 806,561, Dec. 12, 1991.

[51] Int. Cl.[5] .......... H04B 10/20; H04J 14/02
[52] U.S. Cl. .......... 359/127; 359/110; 359/121; 359/124; 359/177; 359/178
[58] Field of Search .......... 359/110, 121, 127, 125, 359/124, 161, 177, 178

[56] References Cited

U.S. PATENT DOCUMENTS

| | | | |
|---|---|---|---|
| 4,590,619 | 5/1986 | Winzer | 359/121 |
| 4,712,859 | 12/1987 | Albanese et al. | 350/96.16 |
| 4,902,086 | 2/1990 | Henry et al. | 350/96.12 |
| 4,977,593 | 12/1990 | Ballance | 380/2 |

FOREIGN PATENT DOCUMENTS 0129541  5/1989  Japan .................. 359/121

OTHER PUBLICATIONS

C. Dragone, et al., "Efficient Multichannel Integrated Optics Star Coupler on Silicon," *IEEE Photon. Tech. Lett.* 1, Aug. 1989 pp. 241–243.

C. Dragone, "An N×N Optical Multiplexer Using a Planar Arrangement of Two Star Couplers," *IEEE Photon. Tech. Lett.* 3, Sep. 1991, pp. 812–815.

C. Dragone, et al., "Integrated Optics N×N Multiplexer on Silicon," *IEEE Photon. Tech. Lett.* 3, Oct. 1991, pp. 896–899.

J. R. Stern, et al., "Passive Optical Local Networks for Telephony Applications and Beyond," *Elect. Lett.* 23, (1987) 1255–1257.

I. Sankawa, "Fault Location Technique for In-Service Branched Optical Fiber Networks," *IEEE Photon. Tech. Lett.* 2, (1990) 766–68.

I. Sankawa, et al., "Fiber Measurement Techniques For Passive Double Star Networks," Third IEEE Workshop on Local Optical Networks, (Sep. 24, 1991) 4.2-1 to 4.2-10.

K. Kumozaki et al., "A Study on the Maintenance Aspects of Passive Double Star Networks For Local Loops," IEEE Workshop on Local Optical Networks (May 1990), Section 4.3/1.

*Primary Examiner*—Leslie Pascal
*Attorney, Agent, or Firm*—Martin I. Finston

[57] ABSTRACT

An optical communication network includes at least one single-mode fiber, referred to as a "primary fiber," for transmission between a central office and a distribution node, and at least one multiplicity of single-mode fibers, referred to as "distribution fibers," for transmission between the distribution node and a multiplicity of optical network units (ONUs). Transmissions are exchanged between the primary and distribution fibers via at least one optical coupler located at the distribution node. The network is passive in the sense that all monitoring of the transmission media and the ONUs can be performed at the central office, without active intervention at remote locations. The network includes a monitor and a multiplicity of bypass lines by means of which at least a portion of inbound signals from the distribution fibers are transmitted to the monitor without passing through the optical coupler at the distribution node.

6 Claims, 14 Drawing Sheets

PASSIVE OPTICAL COMMUNICATION NETWORK WITH BROADBAND UPGRADE

CROSS-REFERENCE TO RELATED APPLICATION

This application is a continuation-in-part of my copending application Ser. No. 07/806,561 filed Dec. 12, 1991.

FIELD OF THE INVENTION

This invention relates to optical fiber communication networks.

ART BACKGROUND

In a passive optical communication network, signals from a central office are transmitted through one or more coupling elements to as many as 64 optical network unit (ONU) receivers. Conventional monitoring techniques cannot readily be used to identify faults on individual fibers since the inputs and outputs from each ONU distribution fiber are conventionally multiplexed onto the same feeder fiber going to the central office. Optical time domain reflectometry (OTDR) has, in fact, been used to locate anomalous losses in passive optical networks. However, means have been generally unavailable for identifying features in the received OTDR signals with particular distribution fibers with adequate specificity. Moreover, coupling losses in conventional networks have reduced the sensitivity of OTDR techniques, placing large demands on the power of OTDR laser transmitters.

SUMMARY OF THE INVENTION

Very generally, the inventive network includes a primary optical fiber to carry transmissions between a distribution node and a central office, multiple distribution fibers terminating at ONUs to carry transmissions between the ONUs and the node, and an optical coupler at the node. The network also includes a monitor for receiving transmissions which may include diagnostic information, and additional optical fibers (referred to as "bypass lines") which convey portions of at least some transmissions from the distribution fibers to the monitor without passing through the coupler. The network also includes passive components which physically label the transmissions in the bypass lines in such a way that diagnostic information can be ascribed to individual distribution fibers. The physical labeling is achieved by assigning to each distribution fiber one or more time delays, one or more monitor wavelengths, or a combination of time delays and wavelengths. In this way, coupling losses in monitored transmissions are reduced relative to conventional networks, and individual distribution fibers can be identified using purely passive components.

The invention is more conveniently described with reference to a specific embodiment, depicted in FIG. 1. It should be noted that such embodiment is purely illustrative and not intended to limit the scope of the invention. With reference to FIG. 1, an optical communication network, exemplarily a telephone network, includes at least one single-mode optical fiber 10 for bidirectional transmission between a central office 20 and a distribution node 30. The network further includes a multiplicity of optical network units (ONUs) 40 at locations which are remote with respect to the central office. Each such remote location is, e.g., a home, or office, or a curbside substation. The network is passive in the sense that all monitoring of the transmission media and the ONUs can be performed at the central office, without active intervention at remote locations. Significantly, most or all of the information needed for diagnosing faults in the network is impressed upon the monitored signals by passive components. The term "passive optical network" (PON) will hereinafter be used to describe each fiber 10, corresponding multiplicity of ONUs 40, and the intermediate network components which lie between them. (It should be noted that instead of bidirectional fiber 10, a pair of unidirectional fibers may be used. One such unidirectional fiber belongs to an inbound, and the other to an outbound, PON, as discussed below.) Multiple fibers 10 may emanate from a single central office, and thus one central office may support a multiplicity of PONs.

Each ONU is capable of sending and receiving optical signals which represent digitized communication signals. For signal transmission, each ONU includes, e.g., a solid state diode laser operating at a predetermined signal wavelength. Each ONU 40 communicates bidirectionally with node 30 by way of, e.g., one single-mode optical fiber 50. (Alternatively, a pair of unidirectionally transmitting fibers may be provided in place of fiber 50. In such a case, as noted above, a pair of similar passive networks are provided, one for each direction of transmission between the central office and the ONUs.) Because transmissions from multiple ONUs are carried on a single fiber 10, some form of multiplexing is needed. Accordingly, the network further includes means for synchronizing the transmissions from the ONUs in order to produce a time-division multiplexed signal that can be carried by fiber 10 toward the central office. That is, time-division multiplexing is used to interleave pulse packets from different ONUs. The bit rate within a packet is typically about 30 Megabit/s, and thus individual pulses are typically separated by about 35 ns. A guard band, typically about 500 ns wide, is used to separate the pulse packets from different ONUs.

Signals which are transmitted from the central office toward the ONUs will be referred to herein as "outbound signals". Signals transmitted oppositely will be referred to as "inbound signals." At node 30, each outbound signal is distributed from fiber 10 into multiple fibers 50. Fiber 10 (as well as additional fibers which function analogously to fiber 10) will be referred to herein as a "primary fiber." Fibers 50 (and analogously functioning fibers) will be referred to as "distribution fibers" because, inter alia, they distribute outbound signals to the ONUs. At least some of the components of the network have two ends which may be defined with reference to the directions of signal transmissions. That is, the end of such a component that is closer to a source of outbound signals is herein referred to as the "proximal" end, because it is "proximal" the central office. Similarly, the end that is closer to a source of inbound signals is referred to as the "distal" end because it is "distal" the central office.

At node 30, the outbound signal on fiber 10 is distributed by, e.g., star coupler 60. The exemplary star coupler has multiple ports on its distal end, and also has multiple ports on its proximal end. (Star coupler 60 is typically an $N \times N$ coupler where N is generally at least 8, and is more typically 16.) An end of fiber 10 is connected to one of the proximal ports, such that optical signals pass, e.g., bidirectionally between fiber 10 and the star coupler. Each of fibers 50 is connected, by one end, to one of the distal ports of star coupler 60, such that optical signals pass, e.g., bidirectionally between the respective fiber and the star coupler. Star coupler 60 (as well as additional star couplers which function analogously to it) is referred to herein as a "Stage-1" star coupler. Significantly, star coupler 60 passively splits transmissions from the central office into fibers 50, and it passively combines transmissions from ONUs 40 into fiber 10. (In alternate embodiments, separate inbound and outbound couplers are provided.)

The network also includes a monitor 70 which can be used to detect diagnostic signals. At least some of the signals received by monitor 70 are inbound signals which originate at one or more ONUs, but do not pass through star coupler 60. Instead, optical couplers 80 (which are, exemplarily, 10-dB couplers) are provided to divert portions of inbound signals from at least some of fibers 50 into the distal ends of corresponding bypass lines 90. Each of bypass lines 90 is a single-mode optical fiber. The proximal end of each bypass line 90 optically communicates (at least with respect to inbound transmissions) with monitor 70 such that inbound transmissions are delivered to the monitor without first passing through the star coupler.

In an alternate embodiment, the inventive network includes OTDR monitor 220 of FIG. 12 instead of ONU monitor 70. The OTDR monitor is used to monitor optical loss in individual fibers, loss in splices and connectors, and the locations of fiber faults, such as breaks. At least a portion of the inbound OTDR diagnostic transmissions are delivered to the OTDR monitor without first passing through the star coupler. Preferred embodiments include both an ONU monitor and an OTDR monitor. Still more preferably, the ONU monitor and the OTDR monitor are incorporated in the network using silicon optical bench (SiOB) technology, which is a technology of optical waveguide integrated circuit platforms.

One primary fiber can serve, typically, as many as about 64 ONUs. Thus, about 640 ONUs are readily served from a single central office from which radiate ten primary fibers.

It should be noted that although diagnostic information can be retrieved at the central office through the use of purely passive components, it may be useful to employ an optical amplifier in order to overcome signal loss in the network. Such an amplifier is readily incorporated in the single-mode fiber which carries the signal transmissions into the central office. In fact, such an amplifier is preferably located within the central office in order to avoid the need for remote pumping, and in order to facilitate replacement. In cases where transmission through such an amplifier would interfere with the monitoring scheme, means are readily provided for bypassing the amplifier.

In a broad sense, the invention is an optical communication network which comprises at least one first primary fiber for at least unidirectional transmission from a first distribution node to a central office; a first multiplicity of ONUs, located remotely from the central office, each ONU capable of transmitting and receiving data at least at one signal wavelength; a first multiplicity of distribution fibers for at least unidirectional transmission from the first ONUs to the first distribution node such that each ONU sends data via a respective one of the first distribution fibers; first coupling means, located at the first distribution node, for passively combining transmissions from the first ONUs into the first primary fiber, and means for synchronizing the transmissions from the ONUs, resulting in transmission of a time-division-multiplexed signal to the central office. Moreover, the first coupling means comprise a Stage-1 coupler which has a proximal end including at least one proximal port and a distal end including a plurality of distal ports, each first distribution fiber is optically coupled to one of the distal ports, and the first primary fiber is optically coupled to the proximal port of the Stage-1 coupler. The network further comprises a monitor and a first plurality of bypass lines, each comprising a single-mode optical fiber having proximal and distal ends, the distal end optically coupled to one of the first distribution fibers and the proximal end optically coupled to the monitor. Each bypass line is coupled to the monitor such that portions of at least some transmissions are received by the monitor without passing through the first Stage-1 coupler. Still further, there is associated with each bypass line at least one monitor wavelength or at least one time delay which at least partially identifies the distribution fiber to which that bypass line is coupled. As a result of such association, the locations of at least some faults in the network can be determined on the basis of the delays and/or monitor wavelengths.

DETAILED DESCRIPTION

Figure 1:
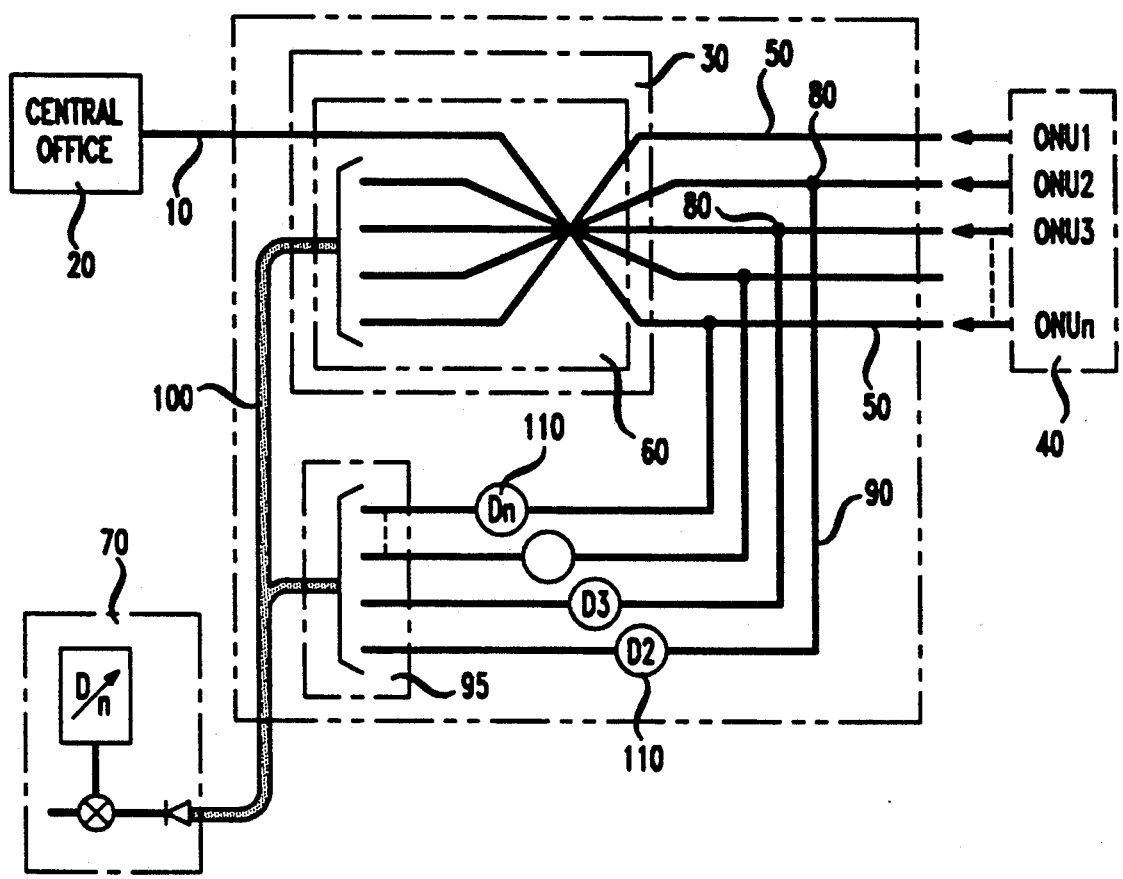
FIG. 1 is a schematic drawing of the inventive network, in one embodiment.

Turning again to FIG. 1, the inventive network in one embodiment further includes a multimode fiber 100 which is optically coupled at its proximal end to monitor 70, and at its distal end to one or more proximal ports of star coupler 60, exclusive of the port to which fiber 10 is attached. (Embodiments of the invention which include star couplers are described for illustrative purposes. Alternate embodiments of the invention which have the same architectures as those described, but which use splitters, combiners, and couplers other than star couplers are readily envisioned.) Fiber 100 (as well as additional multimode fibers which function analogously to fiber 100) is referred to herein as a "Stage-1 loopback fiber". The proximal end of each of N bypass lines 90 is connected to the loopback fiber by means of a coupler 95 suitable for combining the output of N single-mode fibers into the multimode loopback fiber. As a consequence, inbound signals on the bypass lines are coupled into the loopback fiber, and from the loopback fiber into the monitor.

Figure 2:
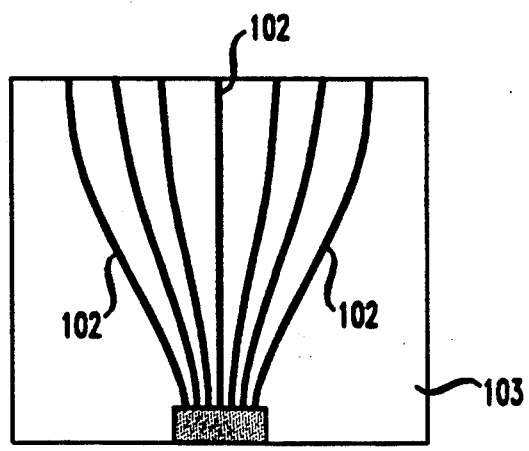
FIG. 2 is a schematic representation of an exemplary single-mode-to-multimode optical coupler.

A suitable single-mode-to-multimode coupler is conveniently described in terms of the single-mode fiber core diameter a, core-to-cladding refractive-index difference $\Delta$, cladding refractive index n, and numerical aperture n.a. An exemplary, commercially available multimode fiber has a core diameter of 62.5 $\mu$m and a numerical aperture of about 0.22. The coupler is formed, as shown in FIG. 2, by, in effect, tapering down to insignificant size the cladding thickness which separate the cores of N respective single-mode waveguiding channels 102. The resulting waveguide has a core diameter of $N \times a$ and a numerical aperture of n.a. In order to have efficient power coupling to the multimode loopback fiber, the numerical aperture of the loopback fiber should also be n.a., and the core diameter of the loopback fiber should be $N \times a$.

The coupler is exemplarily manufactured by fabricating glass waveguides on a silicon substrate 103. Suitable dimensions are a=4 $\mu$m, $\Delta$=0.014, and n.a.=0.22. Manufacture of components on a SiOB platform typically involves oxidation of the surface of a single-crystal silicon substrate, followed by phosphosilicate glass deposition, selective glass removal to define the waveguides, smoothing of the waveguides by heating, and deposition of a silica glass cladding. These fabrication processes are described in U.S. Pat. No. 4,902,086, issued to C. H. Henry and R. A. Levy on Feb. 20, 1990.

Figure 3:
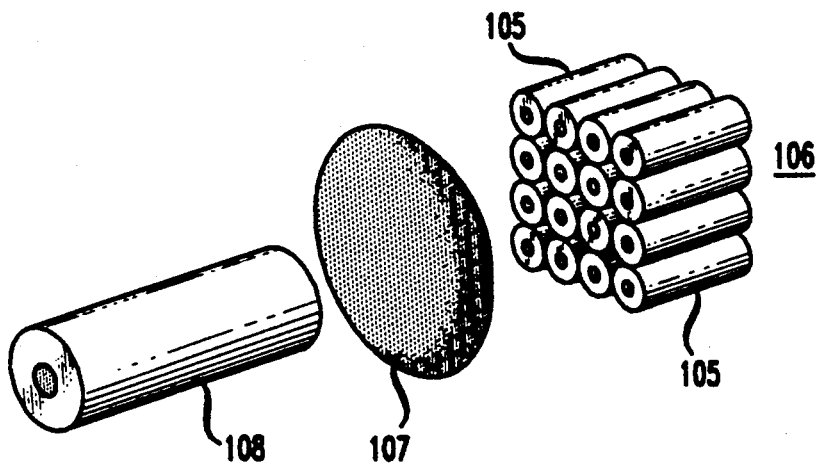
FIG. 3 is a schematic representation of an alternate single-mode-to-multimode optical coupler.

An alternative coupling strategy, depicted in FIG. 3, uses fused fiber couplers instead of SiOB components. Exemplarily, single-mode fibers 105 are used having a=8 $\mu$m and n.a.=approx. 0.1. The fibers are etched down to an outer diameter of about 40 $\mu$m and then combined into a ribbon $4 \times 4$ array 106 with a separation of about 120 $\mu$m between the outermost core regions. A lens 107, such as a graded index rod lens, is used to image the array onto the end of a loopback fiber 108 having, e.g., a core diameter of 62.5 $\mu$m and an outer diameter of 125 $\mu$m.

Thus, turning back to FIG. 1, the loopback fiber is optically coupled both to star coupler 60 and to each of the bypass lines. As a result, a portion of each inbound transmission from ONUs 40 reaches the monitor via the star coupler, and a portion of each transmission (with the possible exception of one ONU, denoted "ONU1" in the figure) reaches the monitor via a bypass line. Significantly, a known time delay is associated with the transmission through each of the bypass lines, relative to the corresponding transmission through the star coupler. (The delay corresponding to ONU1, as represented in the figure, may be regarded as a zero delay.) Each delay is readily adjusted by means, e.g., of optical fiber delay lines 110. Optionally, one or more transmissions in the bypass lines can even be advanced relative to the transmissions through the star coupler, by adding a delay line between the star coupler and fiber 100.

It is well known that multimode fibers generally exhibit greater dispersion than single-mode fibers. This would militate against the use of a multimode fiber as a loopback fiber. However, loopback fiber 100 is relatively short (typically, 5 km or less), and is readily provided with a modest dispersion, e.g., about 1–4 ns/km. At such values, a multimode fiber is readily incorporated in the network without masking the features of the monitor pulse train. Furthermore, the use of a multimode fiber as a loopback fiber is very advantageous because optical coupling of the bypass lines to a multimode loopback fiber (but not to a single-mode fiber) is readily achieved through a multimode interface region such as coupler 95. If monitoring is carried out at the central office, it is advantageous (for reasons of economy) to carry the loopback fiber in the same cable as primary fiber 10. (Multimode fibers are practical to use even if the PON is upgraded to carry high bit-rate information such as HDTV or CATV from the central office to the ONUs. Even in that case, the ONUs will transmit back to the central office only relatively low bit-rate information, which the loopback fiber is designed to monitor.)

Figure 4:
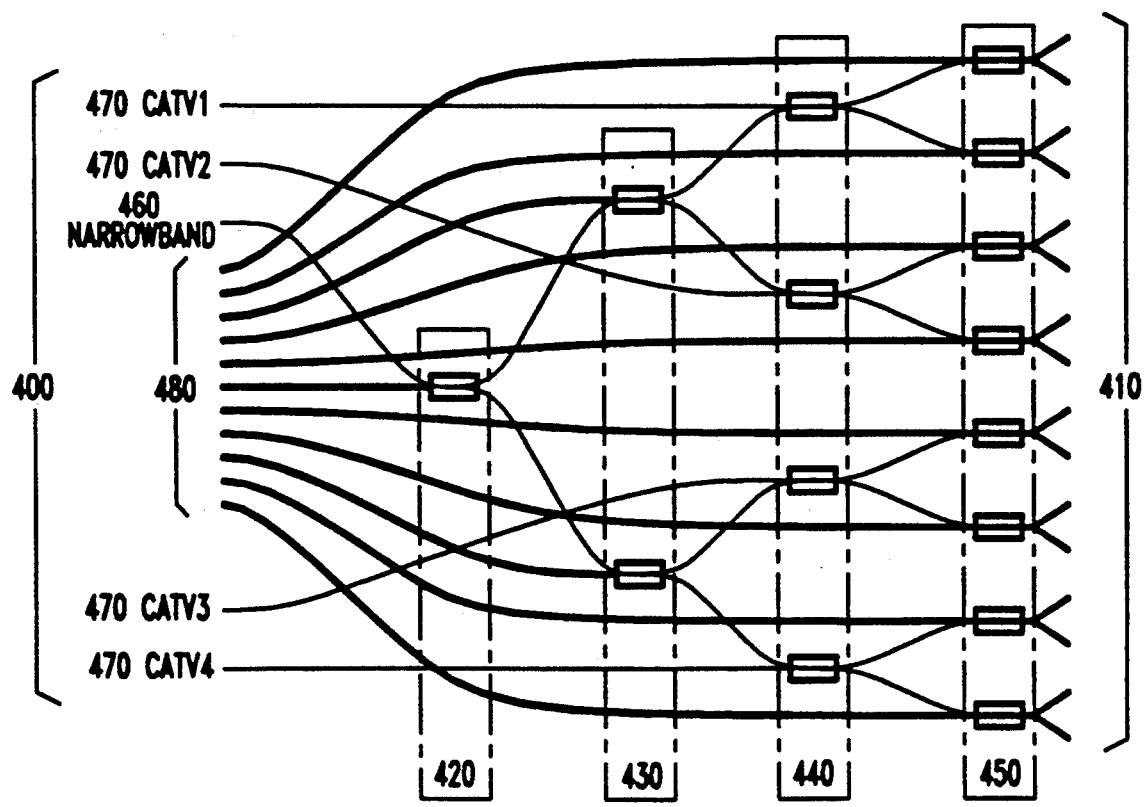
FIG. 4 is a schematic representation of an exemplary N×N optical coupler useful as an alternative to a star coupler in practicing the invention.

It should be noted in this regard that in theory, neglecting coupling losses, a fraction $(N-1)/N$ of the total power in the distal ports of $N \times N$ star coupler 60 can be collected by the loopback fiber by using the $N-1$ proximal ports that are not connected to the central office. An alternative embodiment, which may be made as either a fused fiber or an SiOB component, is shown in FIG. 4. In that embodiment, sixteen proximal ports 400 are coupled to 16 distal ports 410 through four sequential stages of $2 \times 2$ couplers 420, 430, 440, 450.

A particular advantage of such an embodiment is that coupling losses can be reduced in high-bandwidth signals, which have a relatively low dynamic range. That is, four of the sixteen input fibers, carrying specified information (i.e., the fibers 470, denoted "CATV-1-CATV4" in the figure) can be coupled to the output fibers through only two of the four coupler stages, thus substantially reducing coupling loss. With respect to the four input fibers 470, the couplers stages 440 and 450 constitute four $1 \times 4$ combiners.

All sixteen input ports of the constituent $2 \times 2$ couplers are accessible at the proximal end of the component. A single input port 460 connects the central office to all of the output ports. As noted, four input ports 470 connect four CATV input signals through two coupler stages to the output fibers. The remaining eleven proximal ports, i.e., ports 480, are available for monitoring by interconnection with a loopback fiber.

The time delays in the bypass lines are useful for passively identifying faults in the network. That is, any of the ONUs may fail. Such failures are typically manifested by failure to transmit, by continuous (cw) rather than pulsed transmission, by random pulsing at times not prescribed by the protocol for that ONU, or by random pulsing in the guard band. It is conventional to employ active means to identify the ONU which has failed. Such active means typically involve complicated ONU transmitters which include a back-face monitor pulse detector and a protocol for communicating problems back to the central office. It is also typically required to shut down each ONU, in turn, in order to search for the fault. By contrast, the inventive network can be monitored for fault detection without interrupting service transmission. Monitoring is done by monitor 70 (as well as by analogous, additional monitors), which is typically located at the central office. The diagnostic signals used for ONU fault identification may be the ordinary transmissions by the ONUs and are not dependent on the system electronic protocol.

Each ONU transmission produces a main signal, which is received by the monitor via star coupler 60, and a ghost signal, which is received via a bypass line, after a time delay which is associated with a respective one of ONUs 40. (Of course a portion of each ONU transmission also goes to the central office via primary fiber 10. That portion represents the communication, as opposed to diagnostic, portion of the transmission.) Both the main signal and the ghost signal consist of trains of pulses. the ghost pulses appear only on the loopback fiber, and not on the primary fiber. By correlating the main and ghost signals, it is usually possible to identify individual ONUs. Accordingly, monitor 70 includes a signal correlator which is able to identify ghost signals which arrive at predetermined delays relative to the main signal.

If the ONUs are operating normally, both the main signal and the ghost signal have high signal-to-noise ratios (S/N). The main pulses are strong because multiple (typically, $N-1$) proximal ports of the star coupler feed into the loopback fiber, and thus a relatively large fraction of each ONU output fed into the star coupler is delivered to the loopback fiber. The ghost pulses are strong because each delayed signal is delivered to the loopback fiber with only coupling losses; i.e., because the delayed signal is not subdivided among multiple channels, it is free of distribution losses. The intensity of the ghost pulses may, in fact, exceed that of the pulses sent to the central office via fiber 10. In some cases, it may be necessary to attenuate the main pulses in order to optimize the detection capabilities of monitor 70. For example, it may be desirable to limit the intensity of the main pulses to once or twice the intensity of the ghost pulses. If such attenuation is desired, appropriate attenuation means are readily incorporated between the bypass lines and the loopback fiber, or between the distribution fibers and their corresponding bypass lines.

Figure 5:
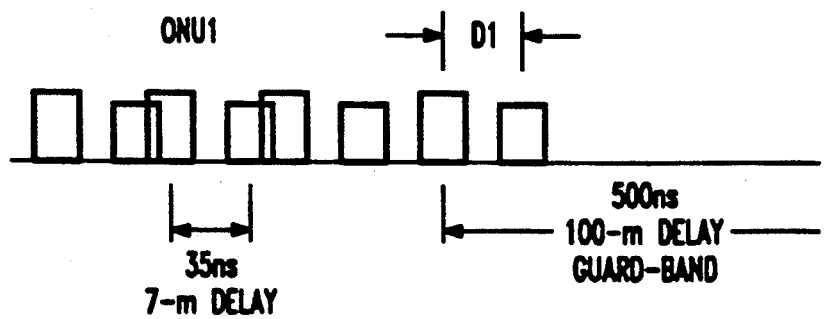
FIGS. 5-7 and 10 are representations of an exemplary monitor time base, showing possible relationships between received main pulses and received ghost pulses.
Figure 6:
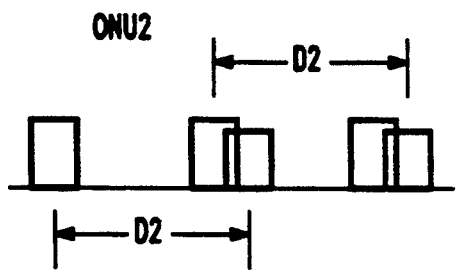
Figure 7:
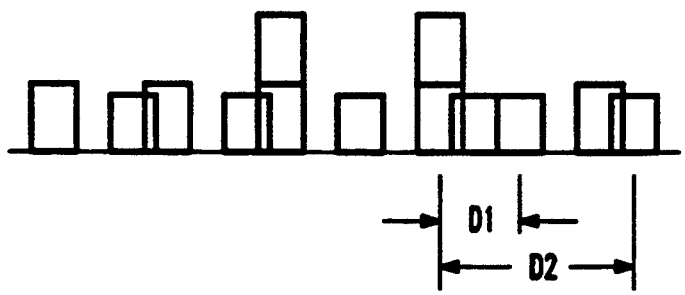

Shown in FIGS. 5 and 6 are portions of an exemplary time base of monitor 70. Portions of pulse trains from two ONUs, denoted ONU1 and ONU2 are visible, in, respectively, FIG. 5 and FIG. 6, together with corresponding ghost pulses. Shown in FIG. 7 is the same time base, with the pulse trains from the two ONUs overlapping. Correlations between main and ghost signals are readily detectable even in case of such overlapping of pulses.

Figure 8:
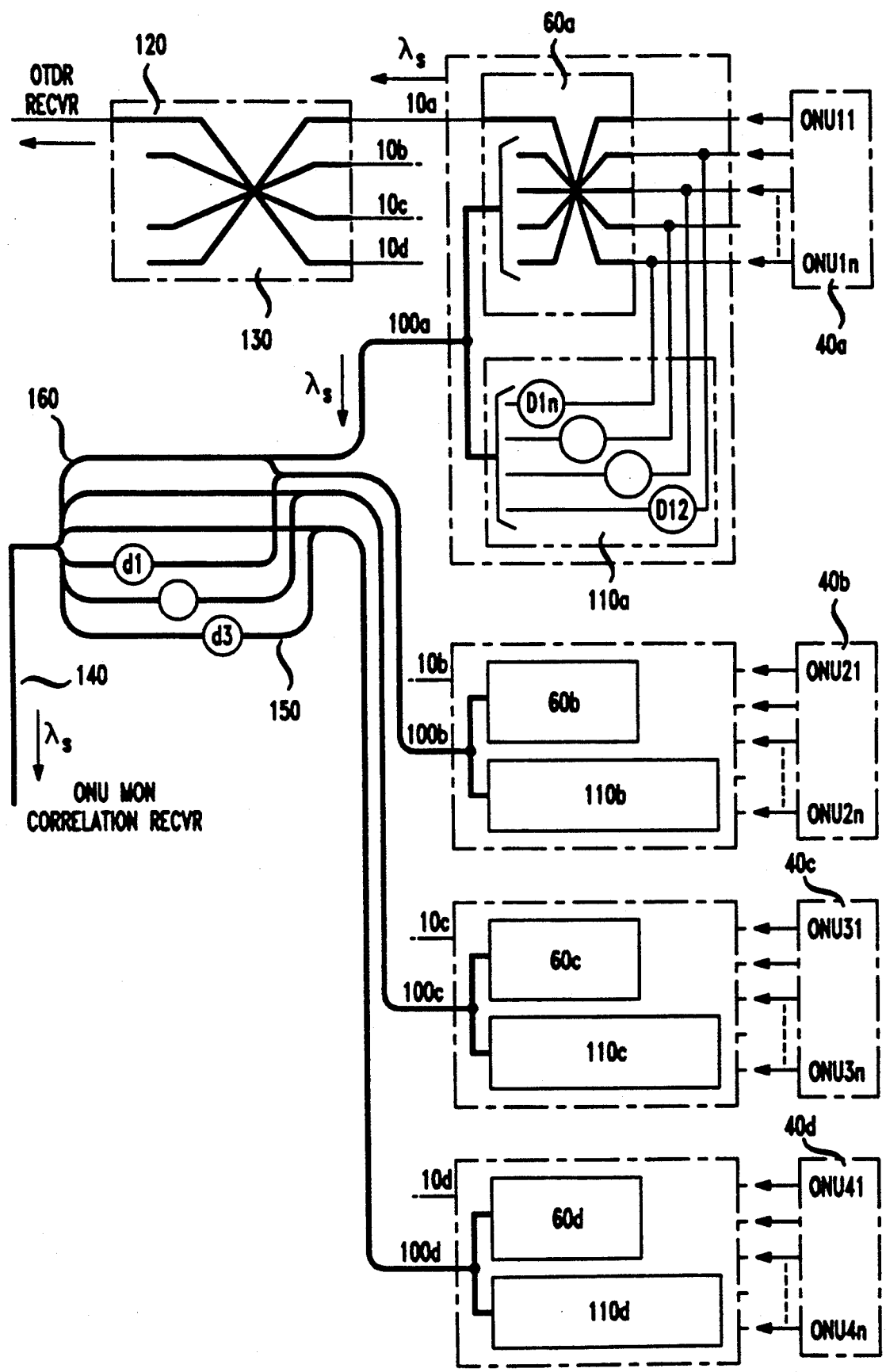
FIG. 8 is a schematic representation of the inventive network in a currently preferred embodiment which includes a Stage-2 coupler as well as multiple Stage-1 couplers.

In a currently preferred embodiment, depicted in FIG. 8, a single central office serves multiple primary fibers 10a–10d. (Multiplicities of four are shown in the figure for illustrative purposes only. The actual numbers to be used in practice are not limited by the depictions in the figures.) Bidirectional communication between the primary fibers and the central office takes place via a secondary fiber 120. Fiber 120 is also a single-mode optical fiber. Star coupler 130, referred to herein as a "Stage-2 star coupler", is provided to effect the optical coupling between the primary fibers and the secondary fiber. Each primary fiber is connected to a respective distal port of star coupler 130, and fiber 120 is connected to one of the proximal ports. As shown in the figure, at each of multiple distribution nodes, a primary fiber is optically coupled to a multiplicity of distribution fibers (shown as corresponding to ONU multiplicities 40a–40d, respectively, in the figure) via a Stage-1 star coupler (shown as 60a–60d, respectively, in the figure). A multimode, Stage-1 loopback fiber (shown as 100a–100d, respectively, in the figure) is connected to at least one proximal port of each Stage-1 star coupler. Multiplicities of bypass lines (shown as 110a–110d, respectively, in the figure) are provided to couple portions of inbound transmissions from at least some of the distribution lines associated with each node into the corresponding Stage-1 loopback fiber. The arrangement of distribution fibers, Stage-1 star coupler, primary fiber, bypass lines, and Stage-1 loopback fiber corresponding to each node is described by FIG. 1 and the related discussion.

Figure 9:
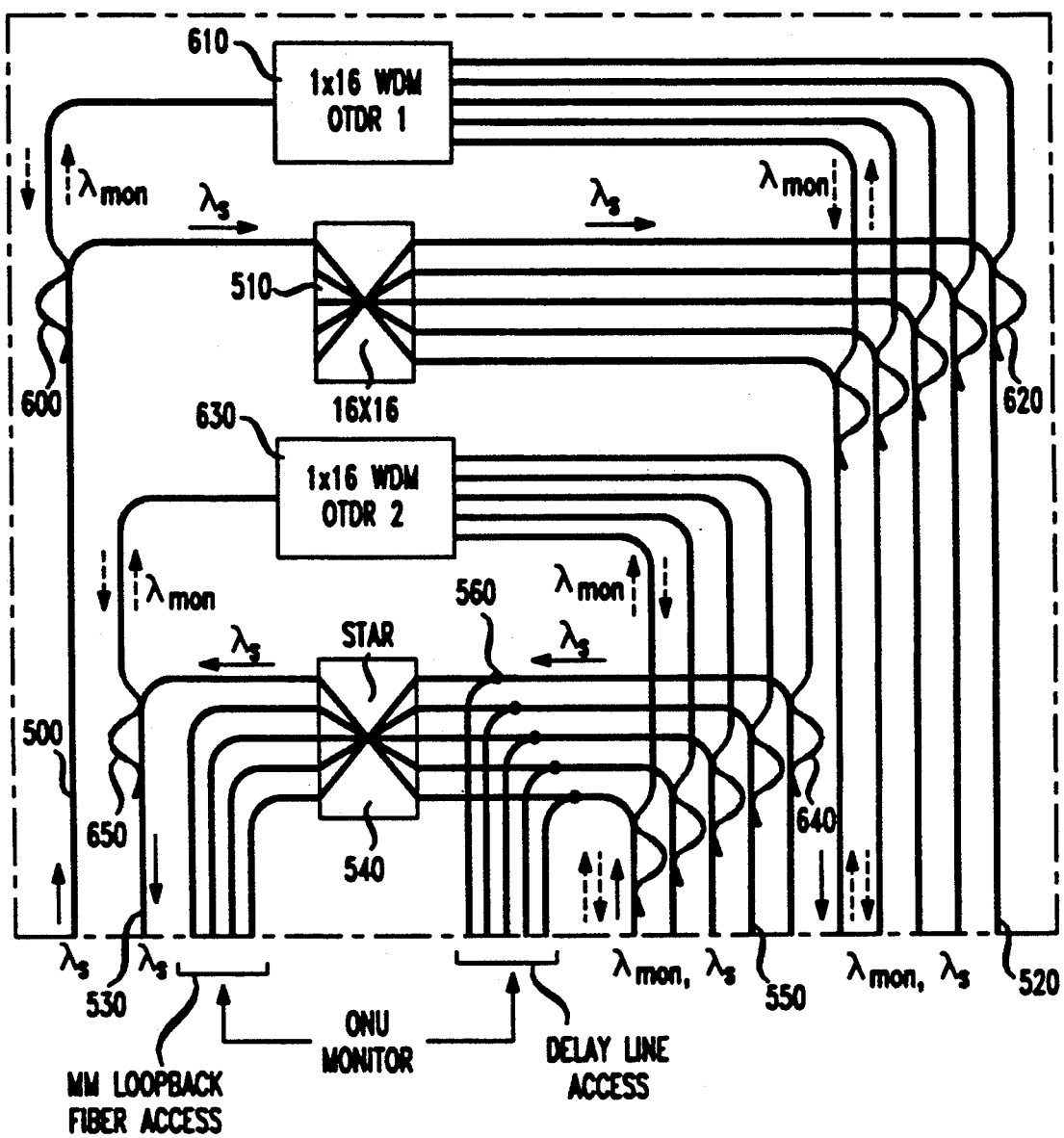
FIG. 9 is a schematic representation of a network architecture which involves unidirectional fibers, incorporates passive components for both OTDR monitoring and ONU monitoring, and can be implemented on a monolithic silicon optical bench platform.

An alternative architecture, shown in FIG. 9, may be used when there is only unidirectional transmission (on a given fiber) between the central office and the ONUs. In that case, there are separate passive optical networks for inbound and outbound communications. All of the optical splitters are preferably fabricated on a single SiOB chip, and corresponding inbound and outbound fibers are situated in the same cable. The ONU monitoring network is preferably housed with network components linking outbound communication fibers. The outbound network includes primary fiber 500 coupled to a proximal port of star coupler 510, and distribution fibers 520 coupled to distal ports of star coupler 510. The inbound network comprises primary fiber 530 coupled to a proximal port of star coupler 540, and distribution fibers 550 coupled to distal ports of star coupler 540. In the inbound network, 10-dB couplers 560 couple the distribution fibers to corresponding bypass lines, and the proximal ports of star coupler 540 unoccupied by primary fiber 530 are coupled to a multimode loopback fiber.

Referring back to FIG. 8, communication signals in a bidirectional architecture pass to and from the central office on secondary fiber 120. Diagnostic signals, however, are transmitted to the central office on multimode fiber 140, which is here referred to as a "Stage-2 loopback fiber." The proximal end of each of the Stage-1 loopback fibers (i.e., fibers 100a–100d of FIG. 8) is optically coupled to fiber 140. For example, the proximal ends of four or even more 625/125-$\mu$m multimode fibers are readily fixed in a two-dimensional array within a ferrule, and optically coupled, via a lens, into a single fiber having dimensions of, e.g., 62.5/125 $\mu$m, 80/125 $\mu$m, or 100/125 $\mu$m. Alternatively, a 1×4 fused-fiber coupler is readily used to combine the outputs of fibers 100a–100d.

In addition, a portion of the inbound transmissions on each (possibly excluding one, as shown in the figure) of the Stage-1 loopback fibers is diverted into the distal end of a corresponding Stage-2 bypass line 150. Each Stage-2 bypass line is a multimode fiber. The proximal ends of bypass lines 150 are optically coupled to fiber 140, e.g., at point 160, exemplarily by a 1×6 fused fiber coupler.

A known transmission delay is associated with each of the Stage-1 bypass lines, relative to transmissions that reach the Stage-1 loopback fiber via the corresponding Stage-1 star coupler. Similarly, a known transmission delay is associated with each of the Stage-2 bypass lines. As discussed above, such delays are readily adjusted by incorporating, e.g., a fiber optic delay line. By contrast, the optical coupling of the Stage-1 loopback fibers into the Stage-2 loopback fiber at, e.g., point 160 does not add substantial relative delays between transmissions from the respective Stage-1 loopback fibers.

The respective delays associated with, e.g., Stage-1 bypass lines 110a may be similar to, or even identical with, those associated with the other multiplicities of bypass lines. In order to assure that each delayed diagnostic signal reaches the monitor with a delay which is sufficiently unique to distinguish, e.g., line 100a transmissions from, e.g., line 100b transmissions, the delays in lines 150 are added onto the delays in lines 110a–110d.

Figure 10:
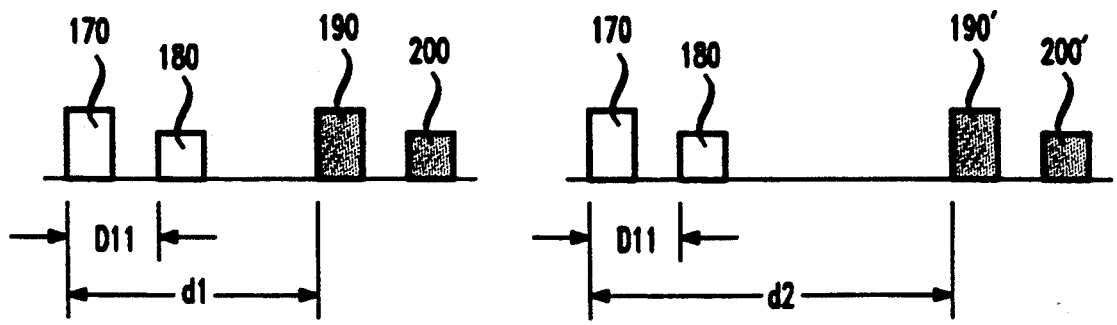

Shown in FIG. 10 is an exemplary monitor time base. Pulses from two distinct ONUs, denoted ONU21 (from multiplicity 40b of FIG. 8) and ONU31 (from multiplicity 40c) are shown. Pulses 170 are the main pulses. The same delay is introduced by each of the respective Stage-1 bypass lines, and thus at that stage, the same delay D11 is produced between each main pulse 170 and ghost pulse 180. However, distinct delays are produced by Stage-2 bypass lines 150. Thus, the inbound transmission from line 100b is delayed by an additional amount d1, producing, at the monitor, a singly delayed ghost pulse 190 and a doubly delayed ghost pulse 200. Similarly, the inbound transmission from line 100c is delayed by d2, producing singly delayed ghost pulse 190' and doubly delayed ghost pulse 200'. At least the doubly delayed pulses 200 and 200' are readily distinguished by unique delay times D11+d1, and D11+d2, respectively.

The above-described embodiments are useful for identifying faulty ONUs in an optical communication network. However, faults may also occur in the optical fibers of the network. For example, fibers may break and losses may change due to environmental conditions.

Figure 11:
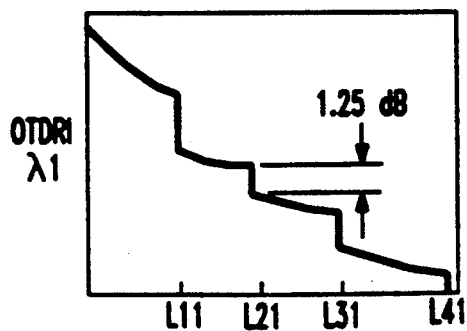
FIG. 11 depicts an illustrative OTDR monitor time base, exhibiting an edge-like feature which could indicate a break in a fiber.

One method for locating such faults is the use of optical time-domain reflectometry (OTDR). This method takes advantage of Rayleigh scattering in the optical network. Rayleigh scattering is an intrinsic loss effect that isotropically scatters a fraction of forward-propagating light over $4\pi$ steradians. In particular, some of the light is backscattered. In OTDR, a portion of the backscattered light, which is collected in the core of the fiber, produces inbound transmissions which are received at the central office and monitored over time. Because backscatter occurs more or less uniformly throughout the fibers of the network, each feature in the outbound transmission gives rise to a continuous smear of echoes, distributed at a continuous range of delays, each delay corresponding to an optical path length between the central office and the point where that echo originated. If a fiber is broken, then echoes which would originate at points distal the break are either substantially attenuated or nonexistent. A corresponding edge-like feature appears on the OTDR monitor time base, as shown, e.g., in FIG. 11.

Figure 12:
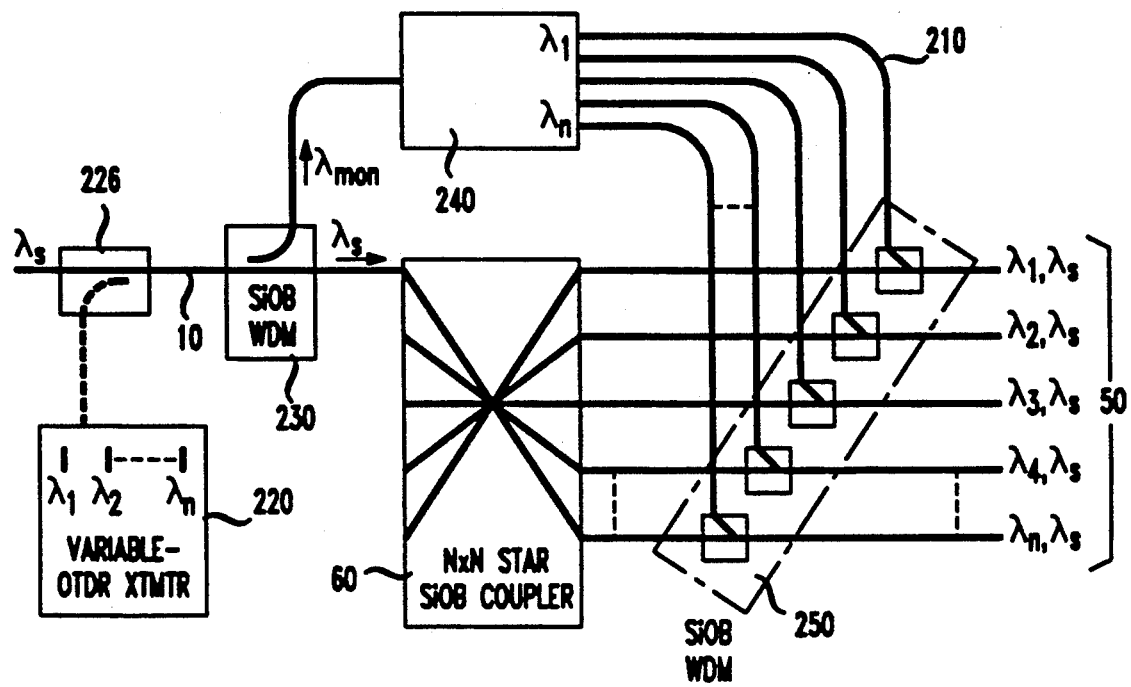
FIG. 12 is a schematic representation of the inventive network in an alternate embodiment adapted for OTDR monitoring in which the bypass lines are coupled to the distribution fibers via wavelength division multiplexers, and OTDR monitoring is done via the primary fiber.
Figure 13:
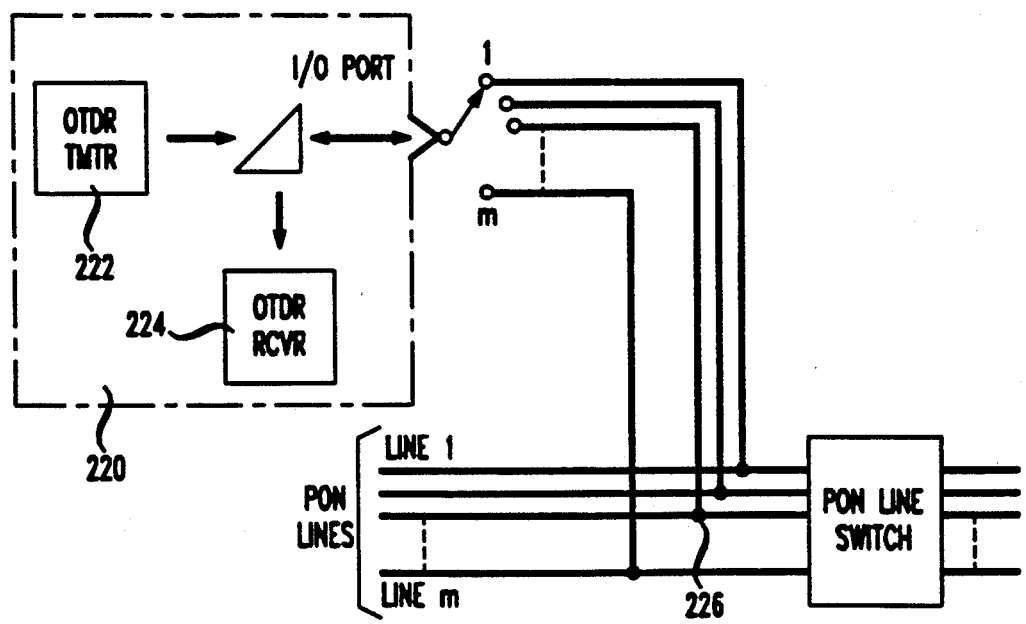
FIG. 13 is a schematic representation of an OTDR monitor and an electromechanical switch for connecting the monitor to one of a multiplicity of PON lines.

With reference to FIGS. 12 and 13, the OTDR monitor 220 is a single-port test instrument, comprising a transmitter 222 and a receiver 224, which is coupled into the optical network through a coarse wavelength-division multiplexer (WDM) 226 located at the central office. Backscattered light, returning from the test fiber, is diverted to the OTDR monitor through a beamsplitter or fused fiber coupler located on the OTDR I/O port. It is desirable to use the same OTDR monitoring equipment for each separate network emanating from the central office. Depicted in FIG. 13 is a 1×m electromechanical switch that may be used to switch the OTDR I/O port to any one of the coarse WDMs which provide input to the m respective networks.

The optical path length from the central office to the break is readily deduced from the delay that corresponds to this feature. Such a method is useful not only for locating fiber faults, but also for detecting loss changes in fibers, and monitoring losses at splices and connectors.

However, when multiple fibers fan out from a distribution node in the network, it is impossible, without further refinements, to identify which of the multiple distribution fibers has a break distal the node. Such a refinement is provided by out invention, in an alternate embodiment to be described below.

With further reference to FIGS. 12 and 13, the invention in one embodiment includes a primary fiber 10, a multiplicity of distribution fibers 50, and a Stage-1 star coupler 60, all interconnected substantially as described above. Also included is a multiplicity of bypass lines 210, each optically coupled at its distal end to one of the distribution fibers, and optically coupled at its proximal end to the primary fiber. From the central office, communication signals are transmitted along fiber 10 at the signal frequency, and from a variable-wavelength OTDR transmitter 222 (typically also located at the central office), diagnostic signals are transmitted along the same fiber at a multiplicity of monitor wavelengths, all of which are different from the signal wavelength.

The optical coupling between lines 10, 210, and 50 is arranged such that outbound transmissions at the signal wavelength pass into star coupler 60, but outbound monitor-wavelength transmissions do not. Instead, a spectrally discriminating component 230 diverts the monitor-wavelength transmissions into bypass lines 210. The monitor-wavelength transmissions are further subdivided such that a unique monitor wavelength, or wavelength range, is assigned to each of the bypass lines and corresponding distribution fibers. Such subdivision is exemplarily achieved by a second spectrally discriminating component 240. Each of components 230 and 240 is, exemplarily, a wavelength-division multiplexer (WDM). Relatively coarse wavelength resolution would suffice for component 230, since the spacing between the signal wavelength and the central monitor wavelength can be made substantially larger than the spacing between respective monitor wavelengths. Higher resolution is then required of component 240, in order to resolve the individual monitor wavelengths. The distal end of each bypass line is optically coupled to the corresponding distribution fiber via another spectrally discriminating component 250, which is exemplarily yet another WDM. Components 250 admit inbound transmissions at the monitor wavelengths to the bypass lines, but prevent such transmissions from entering star coupler 60.

The arrangement described above permits each distribution fiber to be identified by a unique wavelength or wavelength range, while mitigating round-trip losses in the monitor transmissions by routing such transmissions around star coupler 60. The OTDR transmitter includes, e.g., one or more tunable lasers, or, alternatively, a series of discrete, narrow-line lasers coupled to fiber 10 via WDM 226.

Figure 14:
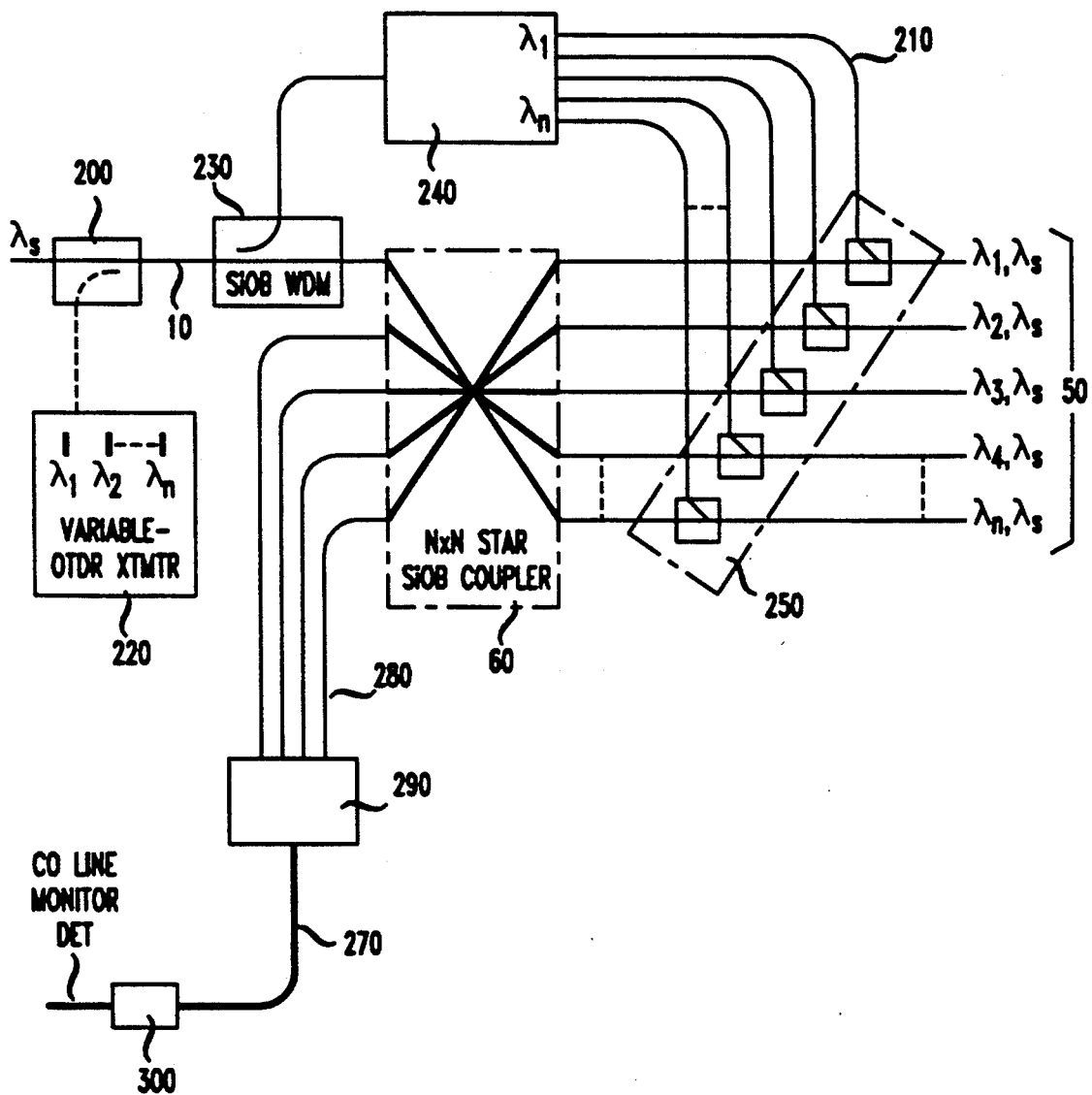
FIG. 14 is a schematic representation of the inventive network in an alternate embodiment adapted for OTDR monitoring in which the bypass lines are coupled to the distribution fibers via 5-dB couplers or similar components, and OTDR monitoring is done via a loopback fiber.

In an alternate embodiment, depicted in FIG. 14, components 250 are not spectrally discriminating, but are, exemplarily, 5-dB couplers. In order to maximize the inbound monitor transmission, that transmission is collected from at least some, and preferably all, of the proximal ports of star coupler 60 (exclusive of the port connected to fiber 10). Optically coupled to those ports is the distal end of multimode loopback fiber 270. Optical coupling is provided by, e.g., single-mode ribbon cable 280, which is connected to the star coupler, and by single-to-multiple mode coupler 290, which optically couples the transmissions from the multiple fibers of the ribbon cable into multimode fiber 270. Fiber 270 carries the inbound monitor transmissions to the monitor via an optical filter 300, which removes the signal wavelength from the transmissions.

Figure 15:
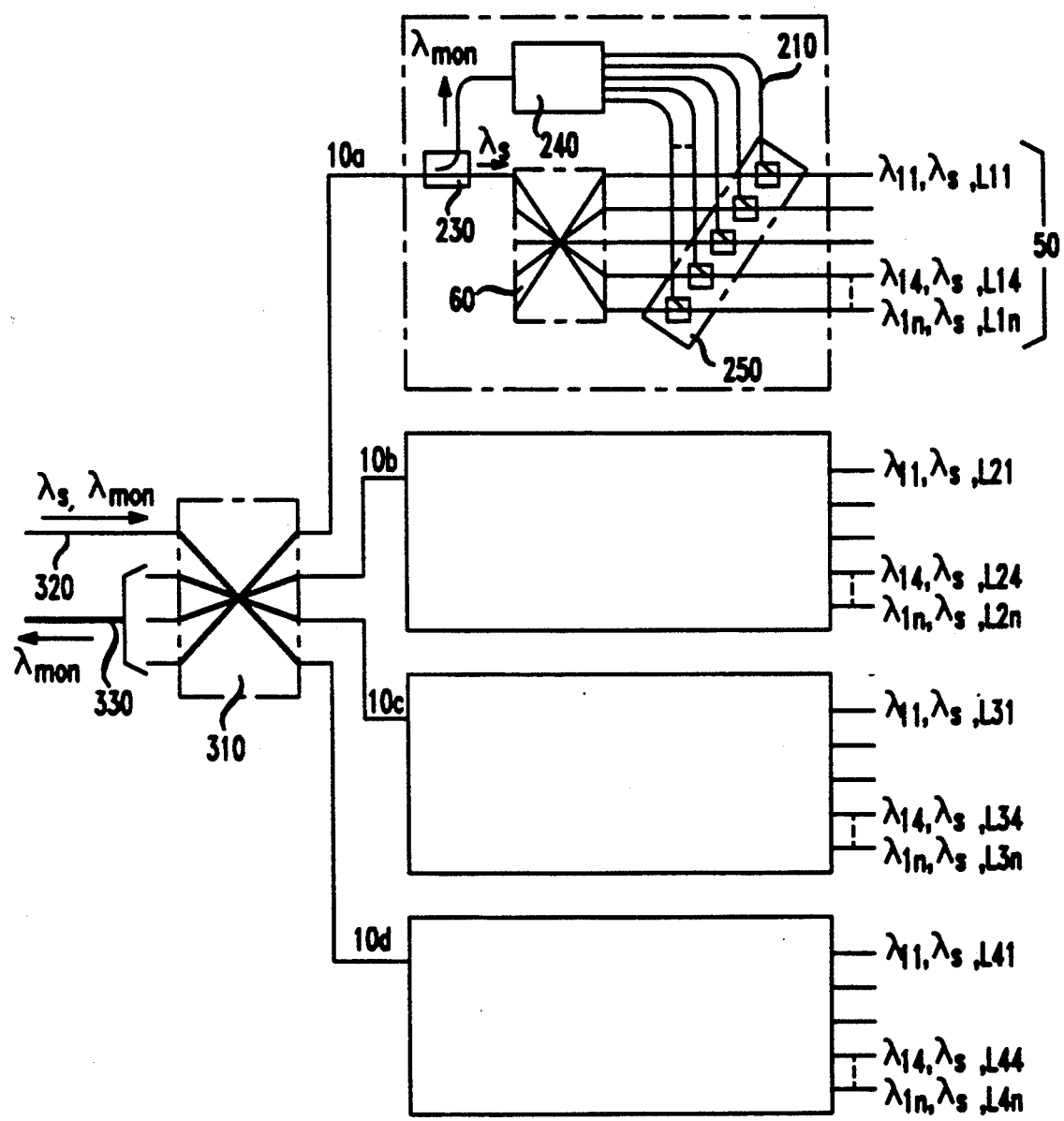
FIG. 15 is a schematic representation of the inventive network in an alternate embodiment adapted for OTDR monitoring, which includes a Stage-2 coupler and multiple Stage-1 couplers, and the same set of monitor wavelengths is assigned to each Stage-1 coupler.

In a preferred embodiment, there are multiple primary fibers, depicted in FIG. 15 as fibers 10a-10d. (Four such fibers are shown in the figure for illustrative purposes. The actual number of primary fibers is not limited by the figure, and, in fact, will more typically be sixteen.) The optical arrangement of FIG. 12, including distribution fibers 50, couplers 250, bypass lines 210, star coupler 60, and couplers 230 and 240 is repeated once for each of the multiple primary fibers. The proximal end of each primary fiber is optically coupled to the distal end of star coupler 310. Single-mode fiber 320, here referred to as a "secondary fiber" is provided for bidirectional transmission of communication signals at the signal wavelength, and for at least outbound transmission of diagnostic signals at multiple monitor wavelengths. Secondary fiber 320 is optically coupled to one of the proximal ports of star coupler 310. (Star coupler 310 is here referred to as a "Stage-2 star coupler.") Multimode fiber 330, here referred to as a "Stage-2 loopback fiber," is provided to carry inbound monitor wavelength transmissions to the monitor. Fiber 330 is optically coupled to at least one, and preferably all, of the proximal ports of star coupler 310, exclusive of the port coupled to fiber 320.

In the arrangement of FIG. 15, the same multiplicity of monitor wavelengths (denoted in the figure by $\lambda_{11}, \ldots, \lambda_{1n}$ for each multiplicity 50 of n distribution fibers) is at least partially repeated for each multiplicity 50 of distribution fibers. Thus, for example, monitor wavelength $\lambda_{11}$ will be distributed into one distribution fiber from primary fiber 10a, and also into a corresponding distribution fiber from primary fiber 10b, etc. As a consequence of the redundant use of monitor wavelengths, further means are required to distinguish each distribution fiber from its counterparts that are associated with the same monitor wavelength. Such means are provided by the transmission delays associated with the different lengths of the respective distribution fibers.

That is, the transmission delay between each distribution fiber which carries a given monitor wavelength and the monitor is readily determinable, and is, or is readily made, sufficiently unique to be used for identifying the distribution fiber. In order to impose readily distinguishable delays, it is straightforward to add fiber optic delay lines to, e.g., any of bypass lines 210. The width $\Delta T$ of OTDR-transmitted pulses is equivalent to the minimum round-trip propagation time and propagation length $\Delta L$. (For example, a $\Delta T$ of 100 ns typically corresponds to a $\Delta L$ of about 10 meters.) Thus, the OTDR can be adapted to resolve loss changes within length increments of 10 meters or more by making $\Delta T$ equal to 100 ns or a proportionally greater value.

Figure 16:
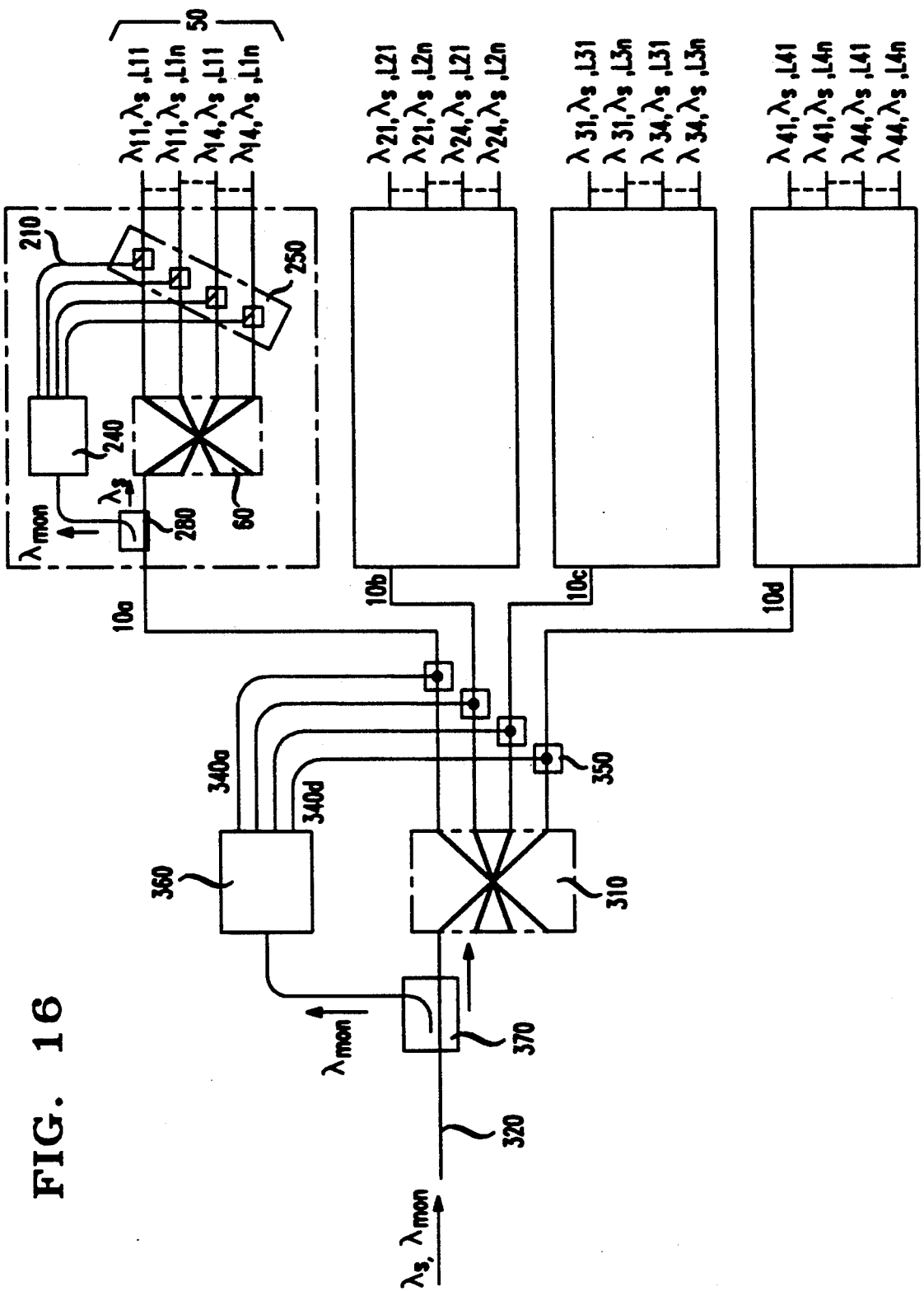
FIG. 16 is a schematic representation of the inventive network in an alternate embodiment adapted for OTDR monitoring, which includes a Stage-2 coupler and multiple Stage-1 couplers, and a different set of monitor wavelengths is assigned to each Stage-1 coupler.

The alternate embodiment of FIG. 16, like the embodiment of FIG. 15, includes repeated optical arrangements of the kind depicted in FIG. 12. However, loopback fiber 330 is omitted and, instead, the inbound monitor-wavelength transmissions are sent to the central office on single-mode, secondary fiber 320. As in the preceding embodiment, signal-wavelength transmissions are coupled via star coupler 310 between the primary and secondary fibers. However, unlike the preceding example, the monitor-wavelength transmissions are routed around the star coupler via a multiplicity of bypass lines, one for each primary fiber. (In the figure, the bypass lines are denoted 340a-340d. Four bypass lines are depicted for illustrative purposes only; the depiction in the figure is not intended to limit the number that may be used. More typically, there will be sixteen primary fibers and sixteen bypass lines.) Bypass lines 340a-340d are here referred to as "Stage-2 bypass lines."

The optical coupling between bypass lines 340a-340d and the primary and secondary fibers is similar to the optical coupling described by FIG. 12 and the related discussion. That is, the distal end of each bypass line is optically coupled to the associated primary fiber via a spectrally discriminating component 350, exemplarily a WDM, which admits inbound signal-wavelength transmissions to star coupler 310, but routes inbound monitor-wavelength transmissions into the bypass line. Spectrally discriminating components 360 and 370 are provided to admit outbound signal-wavelength transmissions to star coupler 310, but to route outbound monitor-wavelength transmissions through the bypass lines. Component 360 is further provided in order to subdivide the monitor-wavelength transmissions and distribute them into selected primary fibers according to wavelength. Each of components 360 and 370 is, exemplarily, a wavelength-division multiplexer (WDM). Relatively coarse wavelength resolution suffices for component 370, and higher resolution is generally required of component 360.

According to the embodiment of FIG. 16, a set of distinct monitor wavelengths is associated with each of the primary fibers and the corresponding distribution fibers. Wavelength sets corresponding to different primary fibers are disjoint; that is, no two primary fibers have any associated monitor wavelengths in common. Each wavelength set consists of at least one wavelength, but will more typically consist of four wavelengths. That is, each primary fiber will typically be associated with sixteen distribution fibers. The distribution fibers will typically be divided into four groupings of four fibers each. A unique monitor wavelength will be associated with each such grouping. Thus, all four fibers within a grouping will share the same monitor wavelength.

Because all four fibers within a grouping will typically share the same monitor wavelength, additional means must be provided for distinguishing the fibers within a grouping. Transmission delays provide a ready solution to the problem. If inherent differences in transmission time are not sufficient, fiber optic delay lines, for example, are readily added to any of the Stage-1 bypass lines in order to provide adequately distinguishable delays.

Referring back to FIG. 9, an OTDR monitoring network is readily made in which the optical fibers are used for unidirectional transmission only, and must therefore occur in pairs of PONS for purposes of bidirectional transmission. Moreover, such a network is readily integrated with an ONU-monitoring network and the passive components of such an integrated network are readily fabricated on, e.g., a SiOB chip.

With further reference to FIG. 9, transmissions at the signal wavelength $\lambda_S$ outbound from the central office are transmitted from primary fiber 500 through star coupler 510. Inbound transmissions from the ONUs at $\lambda_S$ are transmitted from star coupler 540 to primary fiber 530. Transmissions at monitor wavelengths $\lambda_{mon}$ (indicated by dashed arrows in the figure) propagate bidirectionally in each PON. OTDR transmission is toward the ONUs, and backscattered signals from the fiber media return toward the central office. In an exemplary diagnostic procedure, OTDR transmissions are made one monitor wavelength at a time, and an electromechanical switch is used to select the PON that is to be monitored.

According to the network of FIG. 9, coarse WDMs 600 and 650 respectively divert outbound monitor-wavelength transmissions from primary fibers 500 and 530 into WDMs 610 and 630. WDMs 610 and 630 respectively distribute the transmissions, according to their respective monitor wavelengths, into distribution fibers 520 via coarse WDMs 620, and into distribution fibers 550 via coarse WDMs 640. Conversely, inbound WDM transmissions that have been backscattered from the distribution fibers are coupled from inbound distribution fibers 550 into WDM 630 via coarse WDMs 640, and from outbound distribution fibers 520 into WDM 610 via coarse WDMs 620. The respective single-wavelength OTDR transmissions are combined by WDM 630 and coupled into inbound primary fiber 530 via coarse WDM 650, and combined by WDM 610 and coupled into outbound primary fiber 500 via coarse WDM 600.

In one scenario contemplated by planners of optical communication systems, a PON is initially used for narrowband (e.g., for telephonic) communication, and is later upgraded for broadband (e.g., CATV or HDTV) transmission, as well. As noted, an outbound signal in a passive star network is typically distributed to a group of ONUs by way of a 1×16 splitter, or the equivalent. The distribution losses which are incurred in the splitter are generally tolerable for purposes of narrow-band transmission, because the ONU receivers are relatively sensitive. However, broadband receivers are generally less sensitive, and in at least some cases, may not tolerate the distribution losses.

In one aspect, the invention provides a solution to this problem, and offers a convenient strategy for upgrading a PON so that it can deliver broadband analog or digital services between the CO and a group of ONUs, while also retaining a capacity for performance monitoring of the distribution fibers.

A PON having such an upgrade capability is readily made using bidirectional fibers. Alternatively, a pair of PONs having similar capability and consisting of an inbound and an outbound PON, is also readily made using unidirectional fibers. As noted below, it is advantageous to use a pair of unidirectional PONs in order to obviate the losses associated with the directional couplers (e.g., 3 dB couplers) which would otherwise be needed at the input and output ends of the network to separate the transmitted from the received signals. However, for the sake of brevity, the following discussion will be directed primarily to an exemplary, bidirectional PON.

FIG. 12 and the associated discussion relate to a diagnostic scheme in which OTDR inbound and outbound signals are carried by primary fiber 10 and distribution fibers 50, but are shunted around star coupler 60. (More generally, component 60 may be any appropriate 1×N splitter.) The OTDR transmissions occur at monitor wavelengths which are distinct from the signal wavelength. Component 230, exemplarily a coarse WDM, splits off outbound, and recombines inbound, monitor transmissions. Component 240, exemplarily a dense WDM, separates outbound, and recombines inbound, monitor transmissions according to respective monitor wavelengths. Each of components 250, which are exemplarily coarse WDMs, recombines outbound, and splits off inbound, monitor transmissions, relative to a respective one of the distribution fibers.

It should be noted that in this regard, a "coarse WDM" is a component for separating optical transmissions into two relatively wide wavelength channels. For example, one channel might transmit wavelengths less than 1570 nm, and the other channel might transmit wavelengths greater than 1570 nm. Alternatively, one channel might transmit wavelengths in an intermediate range, such as 1430–1460 nm, and the other channel might transmit telecommunication wavelengths both above and below the intermediate range, such as wavelengths near 1300 nm and wavelengths in the range 1500–1600 nm. By contrast, a "dense WDM" separates transmissions into N relatively narrow wavelength channels, N an integer equal to 2 or more, and typically equal to 16. Thus, an exemplary 16-channel dense WDM might have individual channel widths of 0.5-4 nm.

An arrangement analogous to that of FIG. 12 is readily employed for adding a broadband capability to the PON. In such an arrangement, shown in FIG. 17, wavelength-division multiplexing can be used to transmit specified signal channels to specific ONUs, in order, for example, to deliver requested video transmissions to subscribers. Such channels are sometimes referred to as "video on demand" channels, and the corresponding transmission service is sometimes referred to as a "switched video" service, in order to distinguish such channels and such service from the situation where the same broadband signal is indiscriminately transmitted to many ONUs. The latter type of service is sometimes referred to as a "broadcast video" service.

Figure 17:
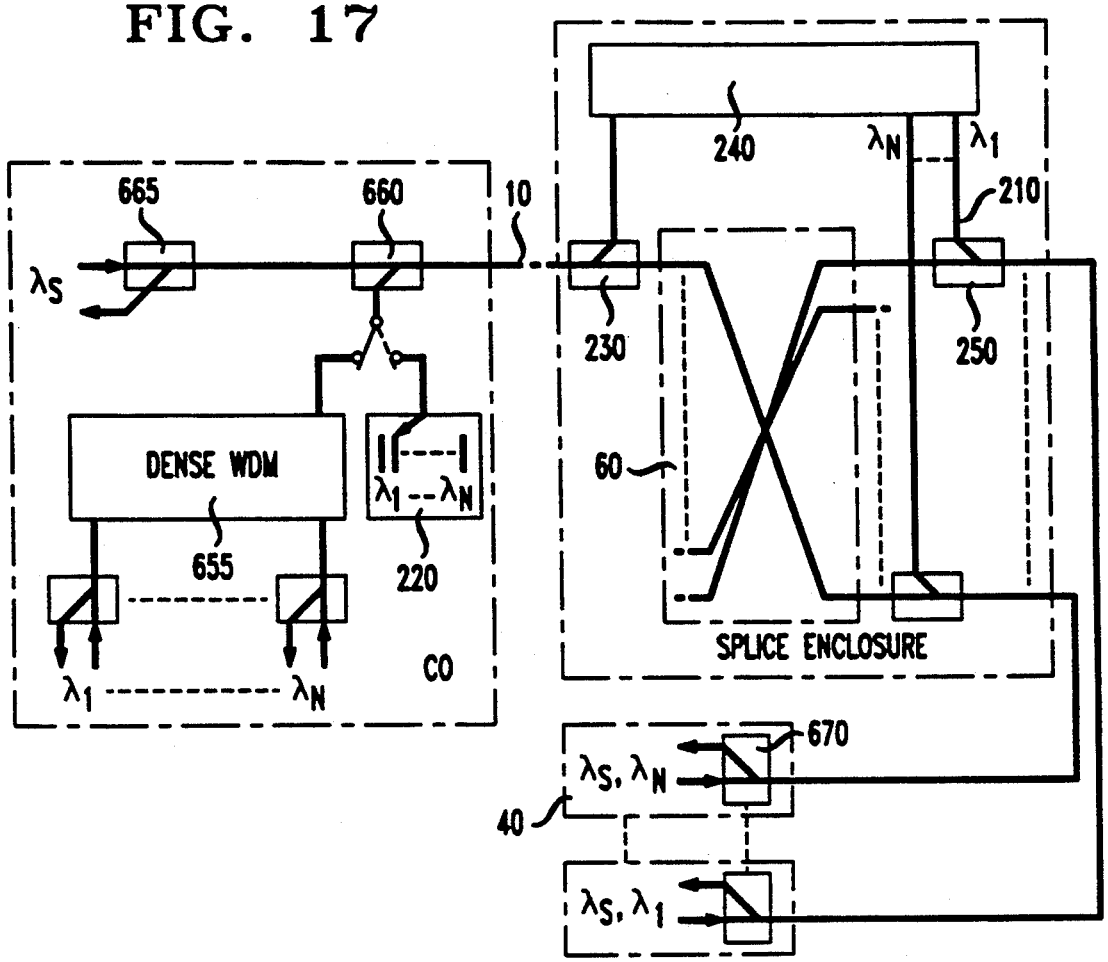
FIG. 17 schematically depicts an illustrative PON, according to the invention in one embodiment, which is adapted to carry both broadcast services and services such as "switched video" services which are transmitted on specific channels to specific ONUs.

With reference to FIG. 17, instead of (or in addition to) "monitor-wavelength" transmissions, "broadband-wavelength" transmissions are shunted around star coupler 60 by the coarse and dense WDMs and associated bypass lines. Exemplarily, each of coarse WDMs 230 and 250 provides two channels: Ch. 1, having a passband of 1280-1320 nm, which is transmitted through splitter 60; and Ch. 2., having a passband of 1430-1460 nm, or 1570-1600 nm, which is diverted around the splitter. (The stated wavelength bands are purely illustrative and are not intended to limit the scope of the invention.) Dense WDM 240 exemplarily provides 16 channels, Ch. 1-Ch. 16, with an interchannel spacing $\Delta\lambda$ of 2 nm, and a combined passband ranging from about 1430 nm to about 1460 nm+16$\Delta\lambda$. For outbound, broadband transmission, one or more lasers at the central office (CO) are tuned (or tunable) to transmit at one or more of the broadband wavelengths assigned to respective ONUs. For inbound, broadband transmissions, a laser at each ONU is tuned to transmit at the broadband wavelength assigned to that ONU. At the central office, broadband transmissions are coupled into and out of primary fiber 10 by way of dense WDM 655 and coarse WDM 660. For purposes of bidirectional transmission, 3-dB directional couplers 665 and 670 are provided, respectively, at the central office and ONU termination points.

Figure 18:
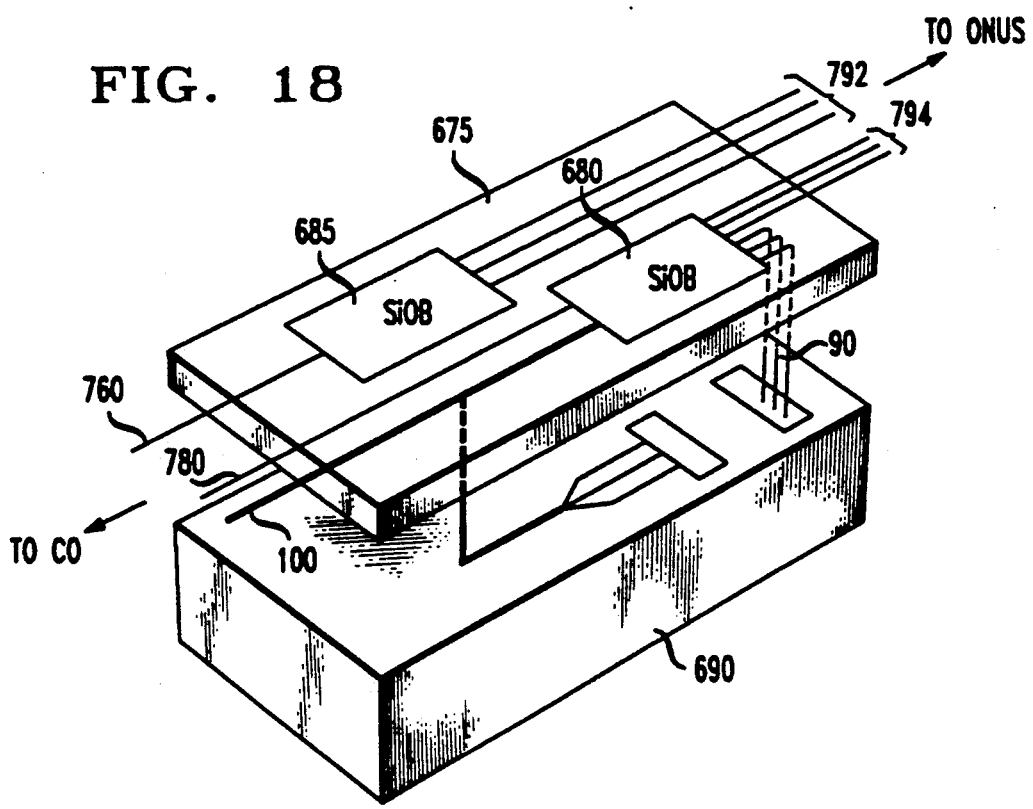
FIG. 18 schematically depicts an illustrative splice enclosure within which a silicon optical bench platform embodying passive components can be housed.

As discussed above in connection with FIG. 9, a silicon optical bench platform which includes a star coupler and the WDM bypass feature described here is readily made. As discussed, provision for ONU monitoring based on relative time delays in received signals is also readily included. Such a platform is readily packaged within, e.g., the standard splice enclosure of FIG. 18. Such an enclosure typically measures 36 cm long $\times$ 8 cm high $\times$ 20 cm deep. As shown in FIG. 18, such an enclosure includes a splice tray 675, which supports portions of outbound primary fibers 760, inbound primary fibers 780, outbound distribution fibers 792, inbound distribution fibers 794, bypass lines 90, and multimode loopback fiber 100. Also supported are splices (not shown) between those fibers and respective inbound and outbound silicon optical bench platforms 680 and 685. The bypass lines and loopback fiber extend into housing 690, which contains fiber optic delay lines 110 (see FIG. 1).

Figure 19:
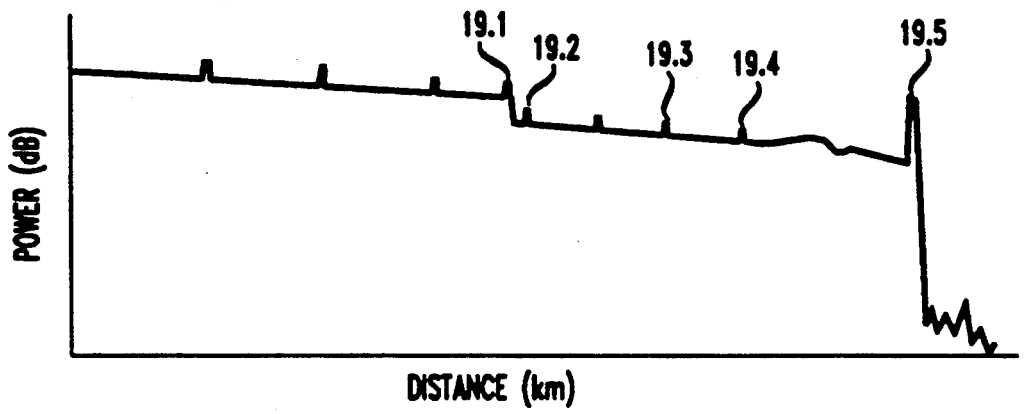
FIG. 19 depicts an illustrative OTDR trace.

According to an illustrative scenario, telecommunication service is initially confined to narrow-band service (e.g., at a data rate of 64 kBs) in, e.g., the 1280-1340 nm region. In such an initial phase, the WDM bypass is used only for OTDR monitoring in order to diagnose media loss in service. Such use is particularly important during the initial deployment phase to ensure the health of the network portions lying distal splitter 60. For example, high resolution OTDR traces, similar to the illustrative traces of FIG. 19, may be used to isolate faults and other sources of loss. For illustrative purposes, FIG. 19 shows typical signatures of distribution loss in a 1$\times$16 splitter (19.1), loss at a splice to the splitter enclosure (19.2), losses at interconnection points in the field (19.3), macrobend losses along the cable, such as might be cause by icing in a conduit (19.4), and loss at the ONU termination (19.5).

According to the illustrative scenario, broadband services are provided in a later phase. Because the WDM bypass is already in place, the upgrade is made without interrupting existing services, and the new channels are introduced without any need to physically enter the splitter housing. By traversing the WDM bypass instead of the (e.g.) 1$\times$16 splitter, the broadband transmissions avoid, typically, about 16 dB of distribution and other splitter losses.

After broadband services are introduced, the use of the WDM bypass for OTDR monitoring of media losses is confined to out-of-service periods. It may even be possible to adapt wavelength-dependent communication lasers at the CO as transmission sources for OTDR monitoring during such out-of-service periods.

Figure 20:
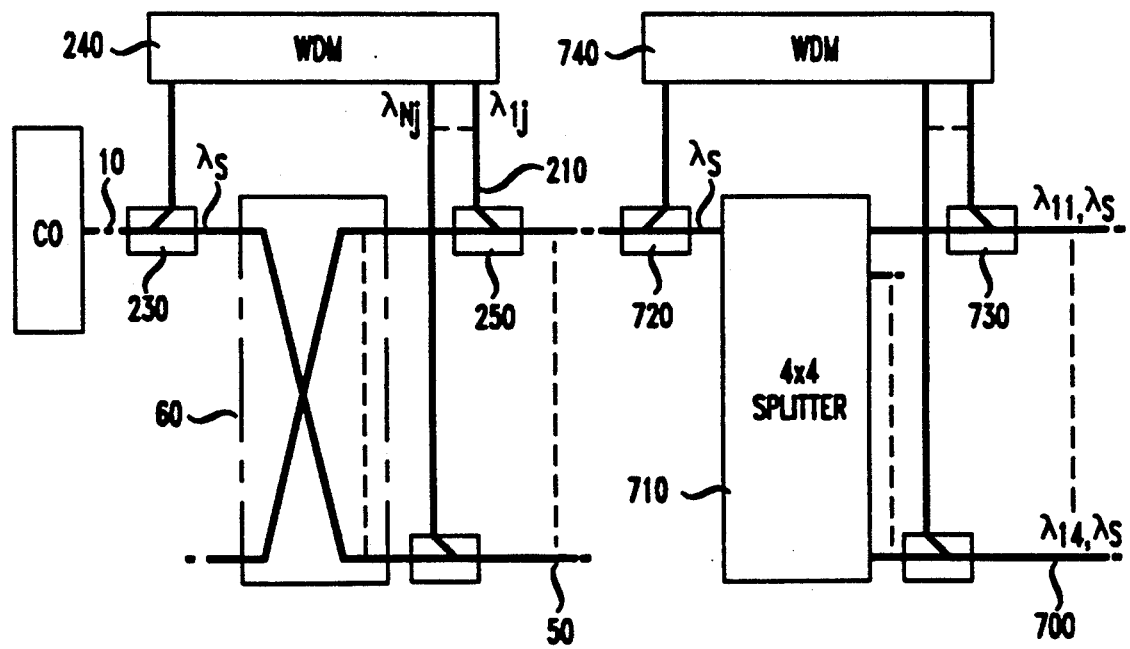
FIG. 20 schematically depicts a modification of the PON of FIG. 17, in which each distribution fiber terminates in a sub-distribution network.

Shown in FIG. 20 is a modification of the network of FIG. 17, in which each of the distribution fibers, distal WDMs 250, terminates not in an ONU, but in a four-way distribution network. Narrowband transmissions are distributed into sub-distribution fibers 700 by 1$\times$4 splitter 710, which is implemented by using, e.g., a 4$\times$4 star coupler. Coarse WDM 720 shunts outbound, broadband transmissions around the splitter, and (in a bidirectional network) recombines inbound, broadband transmissions into the distribution fiber. A terminal enclosure containing such a distribution network is readily installed at, e.g., a curbside location, from which sub-distribution fibers can be extended to, e.g., one or more residential buildings. According to such a modification, each channel of each of WDMs 250 is segmented into four subchannels. This is readily achieved if, for example, each of WDMs 250 has a channel width of 2 nm, segmented by a respective one of curbside dense WDMs 740 into four channels, each of width 0.5 nm. Alternatively, each of WDMs 250 may have a channel width of 4 nm, segmented into four 1-nm channels. Each of coarse WDMs 730 recombines outbound, sub-channel transmissions into the corresponding sub-distribution fiber, and (in a bidirectional network) diverts inbound, subchannel transmissions into WDM 740.

Figure 21:
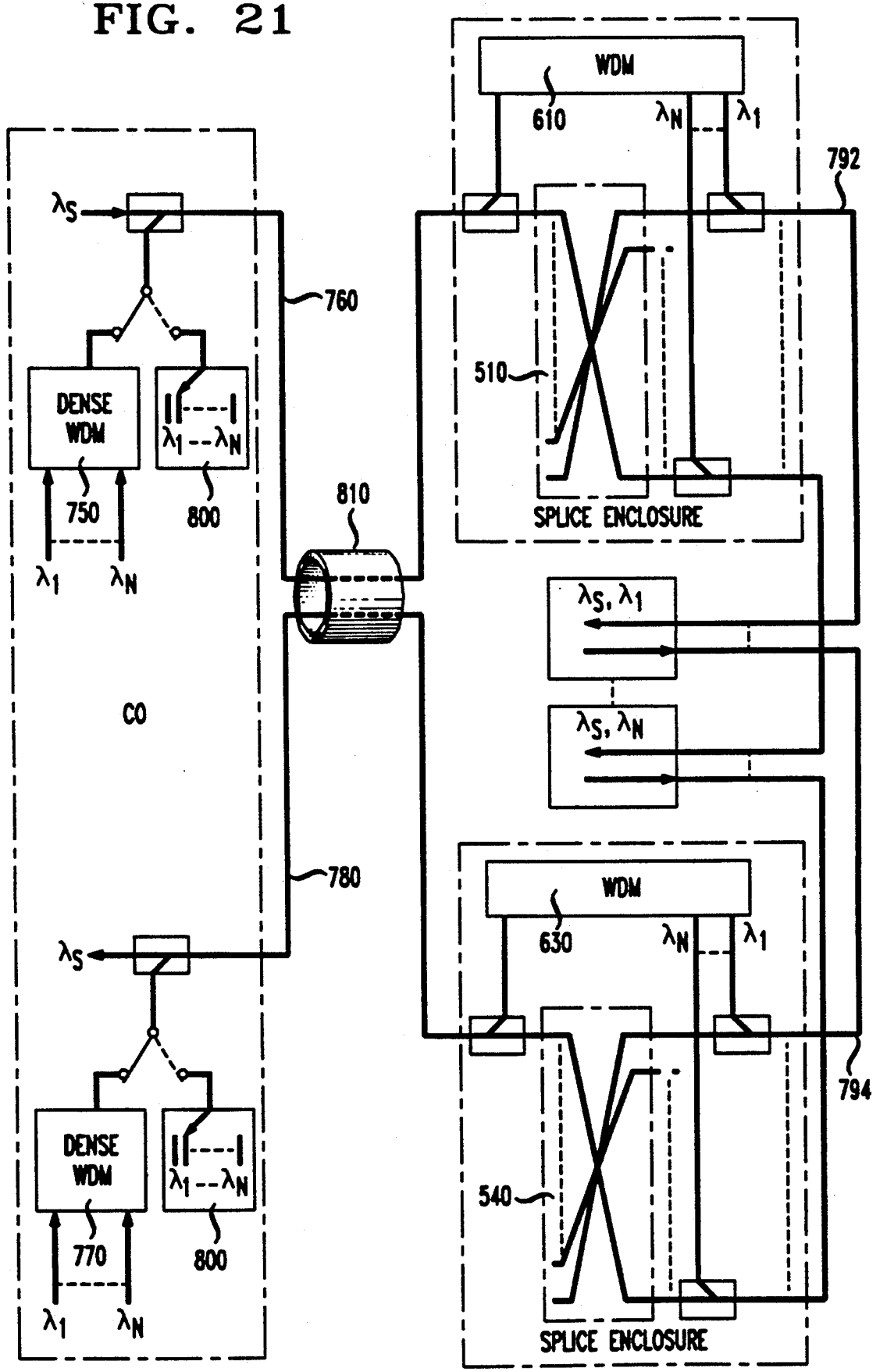
FIG. 21 schematically depicts an optical communication system, according to the invention in one embodiment, which includes two unidirectional PONs.

Shown in FIG. 21 is a pair of unidirectional PONs adapted to provide broadband service. At the central office, WDM 750 for combining outbound signals onto primary fiber 760, and second WDM 770 for separating inbound signals from primary fiber 780, are provided. OTDR receiver 800, which is switched between the inbound and outbound PONs, is also advantageously provided for diagnosing the respective PONs. Primary fibers 760 and 780 are conveniently housed together in a single feeder cable 810. Skilled practitioners will recognize that the unidirectional networks of FIG. 21 are readily extended to include the curbside, sub-distribution networks of FIG. 20.

In addition to providing switched video, the networks of FIGS. 17, 20, and 21 can be used to provide broadcast video (or other broadband) service. In such use, the broadcast video transmissions are distributed through bidirectional splitter 60 or outbound splitter 510 (as well as curbside splitters 710 if they are used) to all ONUs served by the PON. If the broadcast service cannot tolerate 1/N splitter losses, an erbium-doped fiber amplifier may be used to compensate for splitter losses. With the benefit of such amplification, it will be feasible for a single primary fiber to simultaneously serve as many as 16, or even more, ONUs.

Figure 22:
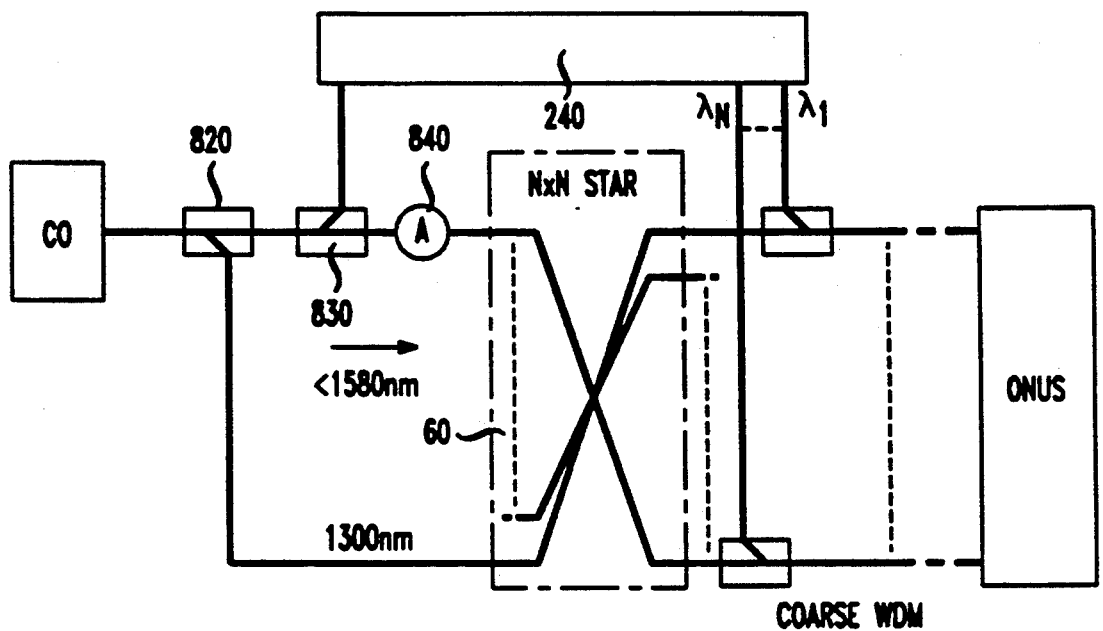
FIG. 22 schematically depicts a PON, according to the invention in one embodiment, which is adapted to carry narrowband, switched broadband, and broadcast broadband transmissions.

A PON adapted to carry narrowband, switched broadband, and broadcast broadband transmissions is depicted in FIG. 22. Coarse WDMs 820 and 830 separate the broadband signals from the narrowband signals. As discussed above, coarse WDM 830 shunts switched broadband signals around splitter 60. Such signals are exemplarily at wavelengths of 1430–1460 nm, or, alternatively, wavelengths greater than 1570 nm. Coarse WDM 820 diverts narrowband signals out of the primary fiber at a point proximal WDM 830. Such signals are exemplarily at a wavelength of 1300 nm. The narrowband signals are fed into an input port of splitter 60. (As depicted in FIG. 22, such port is the bottom port.) The broadcast broadband signals, which lie in the exemplary wavelength range 1530–1560 nm, are fed into a different input port of splitter 60. (As depicted in the figure, such port is the top port.) At a location proximal the relevant input port, the broadcast broadband signals pass through fiber amplifier 840. Fiber amplifier 840 is remotely pumped by 1480 nm light transmitted from the central office.

In an alternative configuration, the fiber amplifier is installed in the central office, and outbound, broadcast broadband signals are already amplified by amplifier 840 when they are injected into the primary fiber. In such a configuration, the narrowband and the broadcast broadband signals can travel the same path to splitter 60 and can enter the splitter through the same input port.

Figure 23:
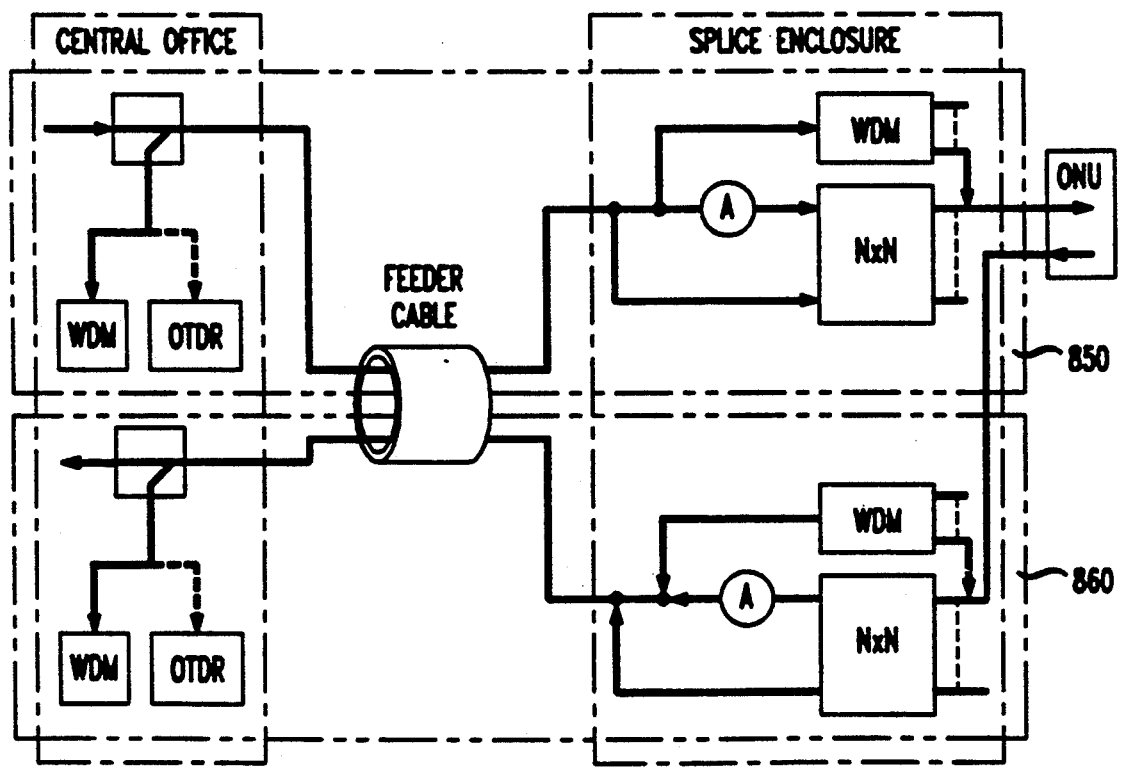
FIG. 23 schematically depicts an optical communication system, according to the invention in one embodiment, which includes two unidirectional PONs, each adapted to carry narrowband, switched broadband, and broadcast broadband transmissions.

An optical isolator is desirably used in conjunction with the fiber amplifier. Such an isolator would limit transmission to the outbound direction. As depicted in simplified fashion in FIG. 23, an outbound, unidirectional PON 850 would carry outbound transmissions, and a second, unidirectional PON 860 would provide transmission in the inbound direction.

As noted, switched video services, exemplarily at wavelengths greater than 1570 nm, are shunted around splitter 60. The same wavelengths can also be used to provide an out-of-service monitoring function. in order to provide in-service monitoring, an additional WDM bypass is readily provided around splitter 60 for designated monitor channels lying, e.g., in the wavelength range 1430–1460 nm. Such a bypass is shown in FIG. 24.

Figure 24:
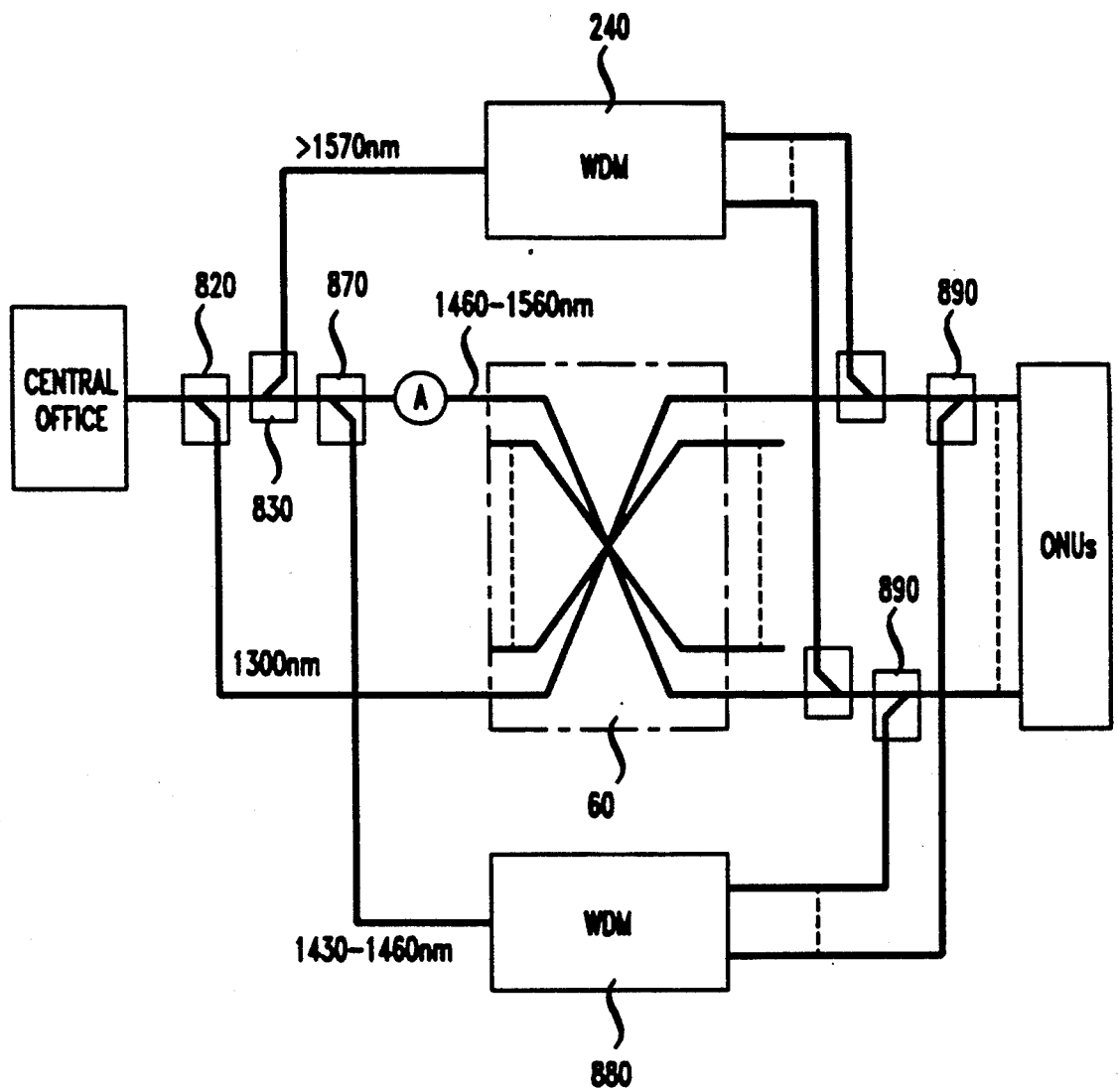
FIG. 24 schematically depicts a PON, according to the invention in one embodiment, which is adapted to carry switched video services, and is also adapted for in-service monitoring on designated channels.

In the WDM bypass of FIG. 24, coarse WDM 870 shunts the monitor-wavelength transmissions around splitter 60, and into dense WDM 880. From WDM 880, each monitor channel is fed into a corresponding distribution fiber by one of coarse WDMs 890.

The configurations of FIGS. 17 and 20–24 offer the advantage that service upgrades are readily effected by adding new services at new wavelengths, without any need to interrupt existing services or to physically alter already-installed (feeder fiber) PON splitters.

EXAMPLE

FIG. 9 shows the architecture for a single SiOB platform capable of supporting a PON in which a unidirectional, outbound, primary fiber 500 and a unidirectional, inbound, primary fiber 530 serve sixteen ONUs. (A simpler analog of this architecture, using bidirectional fibers, is readily apparent.) Except for the delay lines, all passive components needed for signal distribution, ONU monitoring, and OTDR monitoring are integrated on a single silicon wafer, typically 12 cm in diameter. Such a chip is typically housed within an enclosure situated in the field, e.g., at a curbside location. Delay lines are typically formed as lengths of optical fiber which are coupled to access points on the chip, because spatial constraints militate against integrating them as waveguides on the chip.

Designs of SiOB passive devices, useful in this context, have been published. For example, a 19×19 star coupler has been reported in C. Dragone, et al., "Efficient Multichannel Integrated Optics Star Coupler on Silicon," *IEEE Photon. Tech. Lett.* 1, (Aug. 1989) 241-243. Similarly, WDMs are reported in C. Dragone, "An N×N Optical Multiplexer Using a Planar Arrangement of Two Star Couplers," *IEEE Photon. Tech. Lett.* 3, (Sep. 1991) 812-815, and in C. Dragone, et al., "Integrated Optics N×N Multiplexer on Silicon," *IEEE Photon. Tech. Lett.* 3, (Oct. 1991) 896-899.

On the SiOB chip, the spacing between waveguides is typically in the range 0.25–1.0 mm. The radius of curvature of waveguides is typically 5–10 mm. Waveguide crossovers can be made having very low cross-talk (i.e., less than −45 dB) and very low insertion loss (i.e., less than −0.05 dB) if the waveguide crossover angle is greater than 15°.

The waveguide loss is typically 0.02 dB/cm. The WDM channel spacing is typically 2 nm. The temperature shift $\Delta\lambda$ of the WDMs is typically about 0.014 nm/°C. Such values of $\Delta\lambda$ assure good environmental performance under field conditions. Moreover, active feedback can be employed at the central office in order to tune the OTDR monitor wavelengths to the centers of the WDM channels if the backscattered signals suffer excessive loss due to detuning.

The monitor wavelengths $\lambda_{mon}$ typically lie within nontelecommunication bands such as 1430 nm–1460 nm, or at wavelengths greater than 1560 nm. The pulsed OTDR transmitter is, exemplarily, a DBR (distributed Bragg reflector) laser, having a tuning range of about 8–10 nm.

The peak pulse power of the laser can be increased by as much as 11 dB, up to a maximum of about 150 mW, by integrating it with a semiconductor optical amplifier. Nonlinear back-scattering due to stimulated Brillouin effects (SBS) will not pose a problem since the high optical power is concentrated in individual narrow pulses at relatively low repetition-rates. The power threshold for SBS is $$P_{th} \approx \frac{21 A_{eff}}{G L_{eff}},$$

where $G = 2 \times 10^{-9}$ cm/watt, $A_{eff}$ is the core area, and $L_{eff}$ is the nonlinear effective length.

For example, at a 100-ns pulse width (which implies that $L_{eff} = 20$ m) and with $A_{eff} = 50$ $\mu m^2$, $P_{th}$ is approximately 2.6 watts. This threshold value is substantially larger than the peak OTDR pulse power.

The optical loss budget has been calculated for a 1×16 PON as described above. The loss budget is summarized in Table 1. By way of explanation, the losses tabulated in the second and third columns of the table are the losses in excess of the signal loss in a PON without a monitoring system.

TABLE 1

| COMPONENT | Δ SIG | ONU Δ SIG | ONU Δ GHOST | OTDR RT |
|---|---|---|---|---|
| Electromechanical switch | — | — | — | 1.0 |
| Coarse WDM (OTDR access) | 0.6 | — | — | 1.2 |
| Coarse WDM (coupler bypass) | 0.6 | — | — | 1.2 |
| SiOB Dense WDM | — | — | — | 5.0 |
| Coarse WDM (SiOB) (OTDR access) | 0.6 | 0.6 | 0.6 | 1.2 |
| Coarse WDM (Fi-end filter) (recvr pigtail reflector) | 0.5 | — | — | — |
| 10 dB coupler (SiOB) (delay line access) | 0.75 | 0.75 | 10.0 | — |
| 16 × 16 Star Coupler | — | −15.0[1] | −15.0[2] | — |
| 16 SM → 1 MM (delay line interconnect) | — | 5.0 | 2.0 | — |
| 2 × 1 MM fiber combiner (connect loopback fiber) | — | 3.0 | 3.0 | — |
| Fiber loss (Outside plant) | — | — | — | 8.0 |
| Splice loss (Outside plant) | — | — | — | 11.2 |
| TOTAL LOSS (dB) | 3.05 | −5.65 | 0.6 | 28.8 |
| DBR (Power ≈ 10 mw) | | | | |
| DBR/w OA (Power ≈ 150 mw) | | | | |

[1] signal loss through 16 × 16 coupler ≈ 15 db assume MMF interconnect loss ≈ 3 dB
[2] ONU MON Δ SIG bypasses 16 × 16 star coupler

I claim:

1. An optical communication system which comprises: first means for generating optical signals within a first wavelength band; second means for generating optical signals lying within at least some of N mutually disjoint wavelength sub-bands, N an integer greater than 1, the N sub-bands collectively lying within a second wavelength band disjoint from the first wavelength band; and at least one passive optical network, to be referred to as a PON, for conveying optical signals from the first and second generating means to N optical network units, to be referred to as ONUs, at terminal locations, the PON comprising:

a) a primary fiber optically coupled to the first and second generating means;
   b) a plurality of distribution fibers, each optically coupled to a respective ONU or group of ONUs;
   c) means, to be referred to as a splitter, for passively splitting at least some primary-fiber transmissions into the plurality of distribution fibers;
   d) means for optically coupling first-wavelength-band signals into the primary fiber;
   e) means for optically coupling second-wavelength-band signals into the primary fiber such that first-band and second-band signals can be simultaneously coupled, and such that two or more sub-band signals can be simultaneously coupled;
   f) first wavelength-selective means, to be referred to as a first WDM, optically coupled to the primary fiber and to the splitter, the first WDM adapted to divert second-band signals such that the second-band signals are prevented from entering the splitter from the primary fiber, but first-band signals are permitted to enter the splitter from the primary fiber;
   g) bypass means for optically coupling second-band signals, diverted by the first WDM, into the distribution fibers without said second-band signals passing through the splitter; and
   h) second wavelength-selective means, to be referred to as a second WDM, included in the bypass means, the second WDM adapted to couple optical signals lying in each sub-band or predetermined group of sub-bands exclusively into a distribution fiber associated with that sub-band or group.

2. The system of claim 1, wherein the PON further comprises, associated with at least one of the distribution fibers, M sub-distribution fibers, M an integer greater than 1, and the PON further comprises:

a) means, to be referred to as a sub-splitter, for passively splitting at least some transmissions from the distribution fiber into the sub-distribution fibers;
   b) third wavelength-selective means, to be referred to as a third WDM, for diverting second-band signals such that the second-band signals are prevented from entering the sub-splitter from the distribution fiber, but first-band signals are permitted to enter the sub-splitter from the distribution fiber;
   c) means, to be referred to as sub-bypass means, for optically coupling second-band signals, diverted by the third WDM, into the sub-distribution fibers without said second-band signals passing through the sub-splitter; and
   d) fourth wavelength-selective means, to be referred to as a fourth WDM, included in the sub-bypass means, the fourth WDM adapted to couple optical signals lying in each sub-band exclusively into a sub-distribution fiber associated with that sub-band.

3. The system of claim 1, wherein the PON for conveying optical signals from the generating means to the ONUs, to be referred to as an outbound PON, is adapted for unidirectional transmission, and the system further comprises:

a) first means for detecting first-band signals and second means for detecting second-band signals;
   b) an inbound PON for conveying optical signals from the ONUs toward the first and second detecting means, the inbound PON being adapted for unidirectional transmission, and the inbound PON including an inbound primary fiber;
   c) means for optically coupling first-wavelength-band signals from the inbound primary fiber into the first detecting means; and
   d) means for optically coupling second-wavelength-band signals from the inbound primary fiber into the second detecting means such that first-band and second-band signals can be simultaneously detected, and such that two or more sub-band signals can be simultaneously detected.

4. The system of claim 1, further comprising:

a) third means for generating optical signals lying within a third wavelength band disjoint from the first and second wavelength bands; and
   b) means for optically coupling third-band signals into the primary fiber such that first-band, second-band, and third-band signals can be simultaneously coupled.

5. The system of claim 4, further comprising:

a) an optical fiber amplifier having an input end optically coupled to the primary fiber and an output end optically coupled to the splitter, the optical fiber amplifier being adapted to amplify third-band signals; and b) wavelength-selective means for separating first-band signals from third-band signals such that first-band signals are optically coupled into the splitter without passing through the optical amplifier.

6. The system of claim 5, wherein the first, second, and third generating means are situated at a central office, the amplifier is situated at a location remote from the central office, and the system further comprises:
    a) a source of electromagnetic radiation for pumping the amplifier, said source situated at the central office; and
    b) means for coupling radiation from the source into the primary fiber.

* * * * *